US011184868B2

(12) United States Patent
Su et al.

(10) Patent No.: US 11,184,868 B2
(45) Date of Patent: Nov. 23, 2021

(54) METHOD AND USER EQUIPMENT FOR ACCESS TO NARROWBAND INTERNET OF THINGS (NB IOT)

(71) Applicant: Samsung Electronics Co., Ltd, Suwon-si (KR)

(72) Inventors: Di Su, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 16/604,530

(22) PCT Filed: Apr. 10, 2018

(86) PCT No.: PCT/KR2018/004208
§ 371 (c)(1),
(2) Date: Oct. 10, 2019

(87) PCT Pub. No.: WO2018/190620
PCT Pub. Date: Oct. 18, 2018

(65) Prior Publication Data
US 2020/0163032 A1 May 21, 2020

(30) Foreign Application Priority Data

Apr. 10, 2017 (CN) .......................... 201710229636.7
Aug. 8, 2017 (CN) .......................... 201710671248.4
(Continued)

(51) Int. Cl.
*H04J 3/06* (2006.01)
*H04W 56/00* (2009.01)
(Continued)

(52) U.S. Cl.
CPC ....... *H04W 56/001* (2013.01); *H04L 41/0806* (2013.01); *H04W 48/10* (2013.01);
(Continued)

(58) Field of Classification Search
CPC .............. H04W 56/001; H04W 48/10; H04W 72/1273; H04W 84/18; H04W 56/00;
(Continued)

(56) References Cited

U.S. PATENT DOCUMENTS 10,383,035 B2 * 8/2019 Sheng .................. H04W 40/22
10,973,049 B2 * 4/2021 Xiao .................. H04W 74/0833
(Continued)

FOREIGN PATENT DOCUMENTS

| WO | 2017/014600 A1 | 1/2017 |
| WO | 2017/019133 A1 | 2/2017 |
| WO | 2017/039372 A1 | 3/2017 |

OTHER PUBLICATIONS

European Patent Office, "Supplementary European Search Report," Application No. EP18783660.6, dated Jan. 8, 2020, 12 pages.
(Continued)

*Primary Examiner* — Chuong T Ho

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

The present disclosure discloses a method for access to NB IoT, comprising the following steps of: detecting a NPSS
(Continued)

and a NSSS to realize downlink synchronization; detecting a NPBCH to acquire MIB-NB information; and acquiring SIB1-NB according to the MIB-NB information, wherein at least one of the NPSS, the NSSS, the MIB-NB and the SIB1-NB is transmitted on a non-anchor carrier.

22 Claims, 11 Drawing Sheets

(30) Foreign Application Priority Data

Nov. 16, 2017 (CN) .......................... 201711138388.1
Feb. 11, 2018 (CN) .......................... 201810142604.8

(51) Int. Cl.
  *H04L 12/24* (2006.01)
  *H04W 48/10* (2009.01)
  *H04W 72/12* (2009.01)
  *H04L 5/14* (2006.01)
  *H04W 84/18* (2009.01)

(52) U.S. Cl.
  CPC ........... *H04W 72/1273* (2013.01); *H04L 5/14* (2013.01); *H04W 84/18* (2013.01)

(58) Field of Classification Search
  CPC ............... H04W 48/12; H04W 72/005; H04W 72/0453; H04L 41/0806; H04L 5/14; H04L 5/0098; H04L 5/0053; H04L 5/001; H04L 41/0206; H04L 41/0823; H04L 7/042; H04J 3/0682
  USPC ........................................ 370/329, 330, 350
  See application file for complete search history.

(56) References Cited

U.S. PATENT DOCUMENTS

| | | | |
|---|---|---|---|
| 2018/0092027 A1* | 3/2018 | Sheng | H04W 48/12 |
| 2018/0212726 A1 | 7/2018 | Xue et al. | |
| 2019/0174378 A1* | 6/2019 | Chang | H04W 76/27 |
| 2019/0223212 A1* | 7/2019 | Xiao | H04W 74/02 |
| 2019/0372696 A1* | 12/2019 | Park | H04J 11/005 |
| 2020/0067690 A1* | 2/2020 | Park | H04W 52/243 |

OTHER PUBLICATIONS

Ericsson, "On NB-IoT, eMTC and NR coexistence," R1-1703866, 3GPP TSG RAN1 #88, Athens, Greece, Apr. 13-17, 2017, 10 pages.
Ericsson, "Analysis of redirection to NB-IoT non-anchor carrier," R4-168572, 3GPP TSG RAN WG4 Meeting #80bis, Ljubljana, Slovenia, Oct. 10-14, 2016, 5 pages.
Samsung, "Discussion on DL common channel/signal for TDD NB-IoT," R1-1717570, 3GPP TSG RAN WG1 Meeting #90bis, Prague, CZ, Oct. 9-13, 2017, 4 pages.
Samsung, "Remaining contents of Minimum System Information," R2-1703331, 3GPP TSG-RAN WG2 Meeting #97bis, Spokane, USA, Jan. 17-19, 2017, 5 pages.
Samsung, "Motivation for new WI: Further enhancements on NB-IoT," RP-170677, 3GPP TSG RAN Meeting #75, Dubrovnik, Croatia, Mar. 6-9, 2017, Agenda Item: 10.1.1, Document for: Discussion, 7 pages.
Zte, et al., "Discussion on system acquisition time reduction for NB-IoT," R1-1705488, 3GPP TSG-RAN WG1 Meeting #88bis, Spokane, USA, Apr. 3-7, 2017, 3 pages.
S. Seo et al., "Trends of NB-IoT", Electronics and Telecommunications Trends, ETRI, vol. 31, No. 5, Oct. 2016, 11 pages.
Panasonic, "Relation among NR-PBCH, SIBs and subcells", 3GPP TSG RAN WG1 Meeting #88bis, Apr. 3-7, 2017, 5 pages, R1-1705170.
International Search Report dated Jul. 31, 2018 in connection with International Patent Application No. PCT/KR2018/004208, 3 pages.
Written Opinion of the International Searching Authority dated Jul. 31, 2018 in connection with International Patent Application No. PCT/KR2018/004208, 7 pages.

* cited by examiner

[Fig. 1]
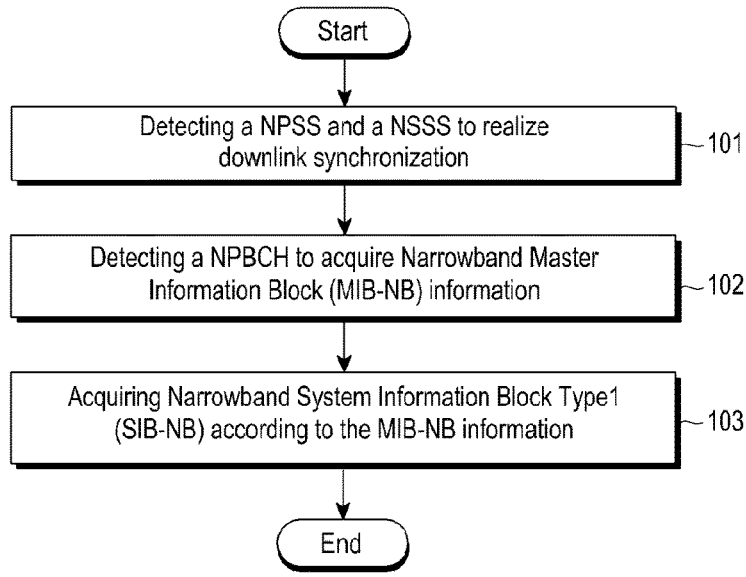
[Fig. 2]
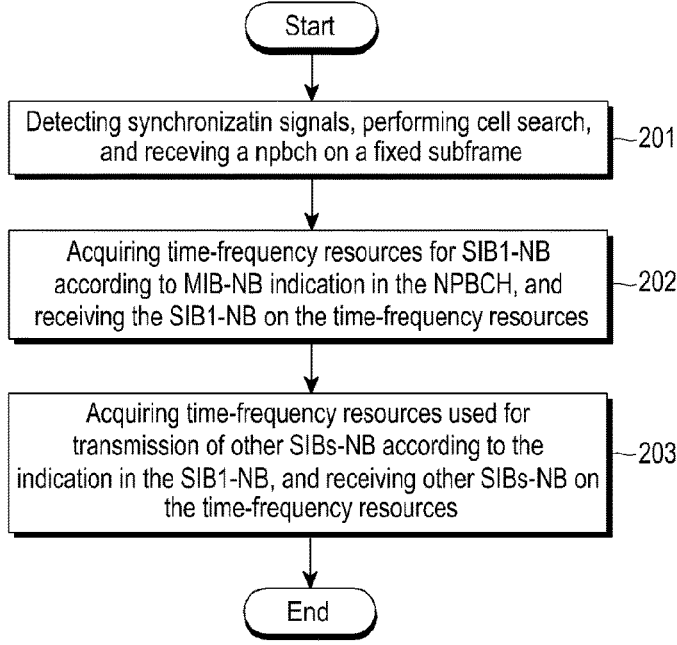
[Fig. 3]
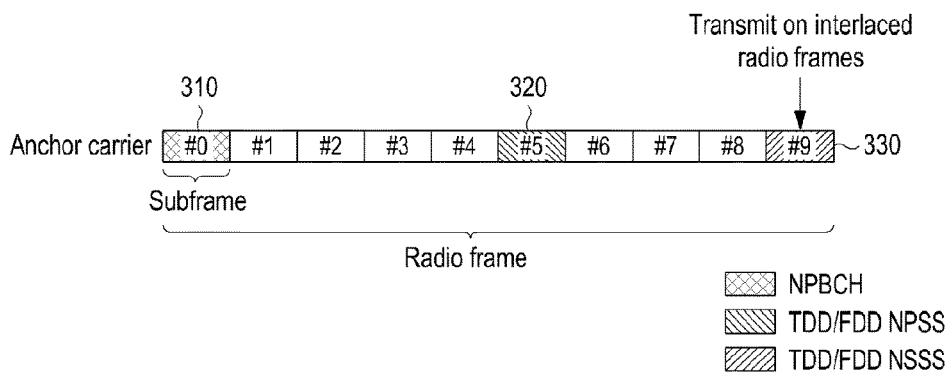

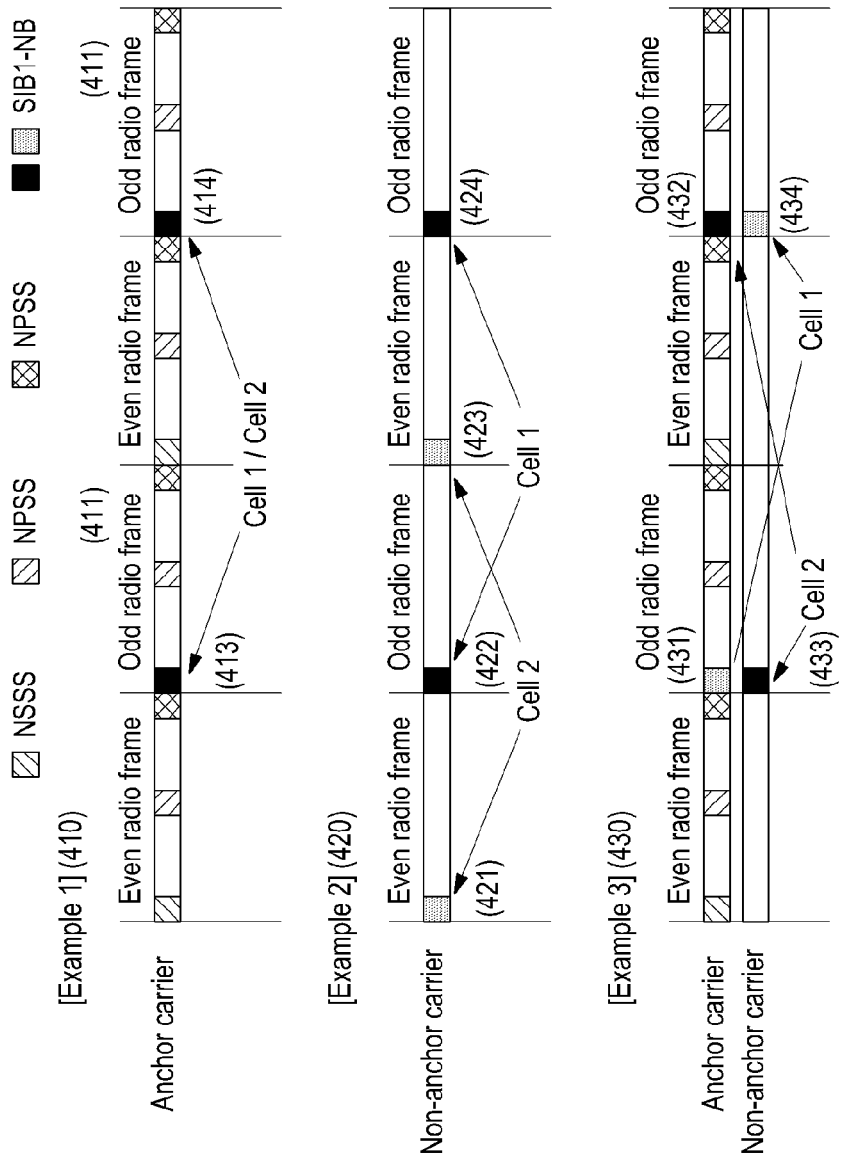
[Fig. 4]

[Fig. 5]
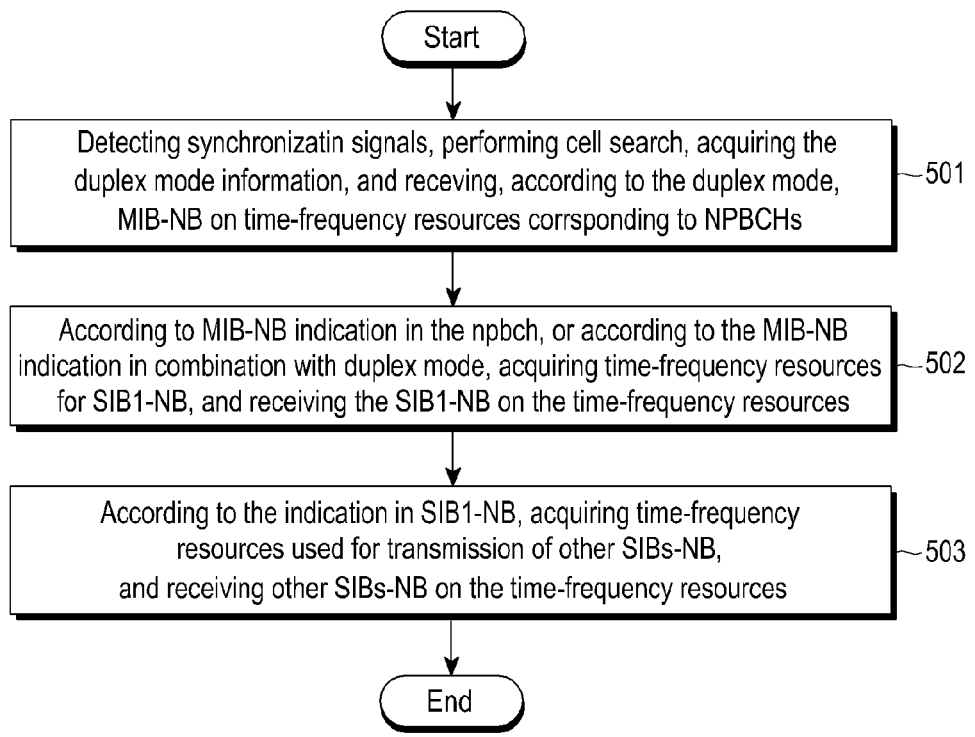

[Fig. 6]
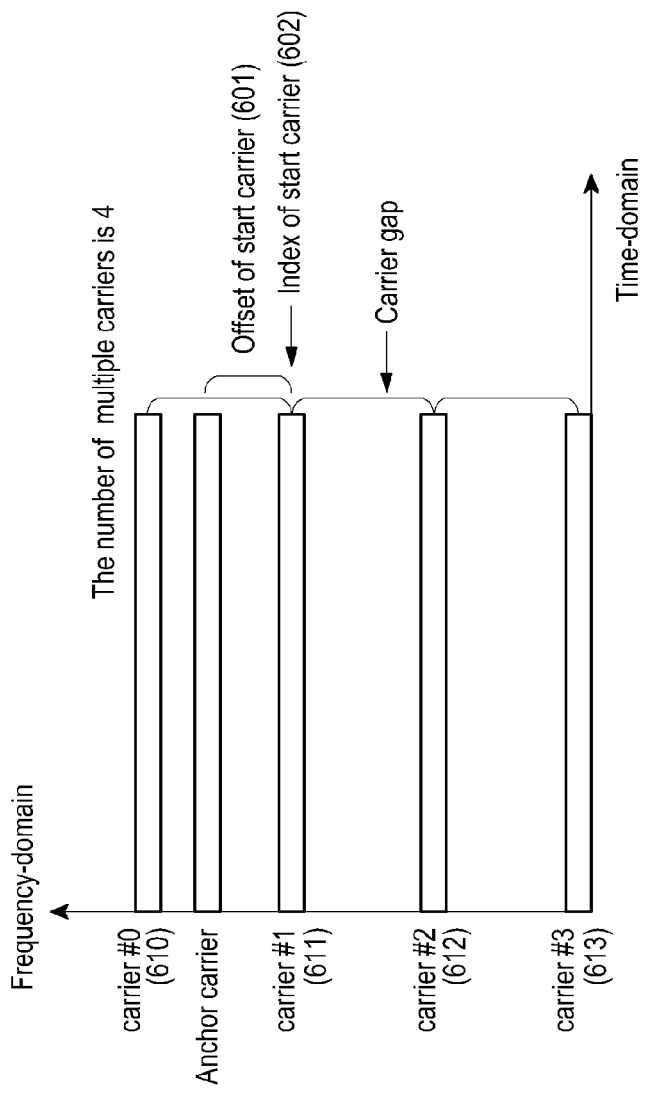

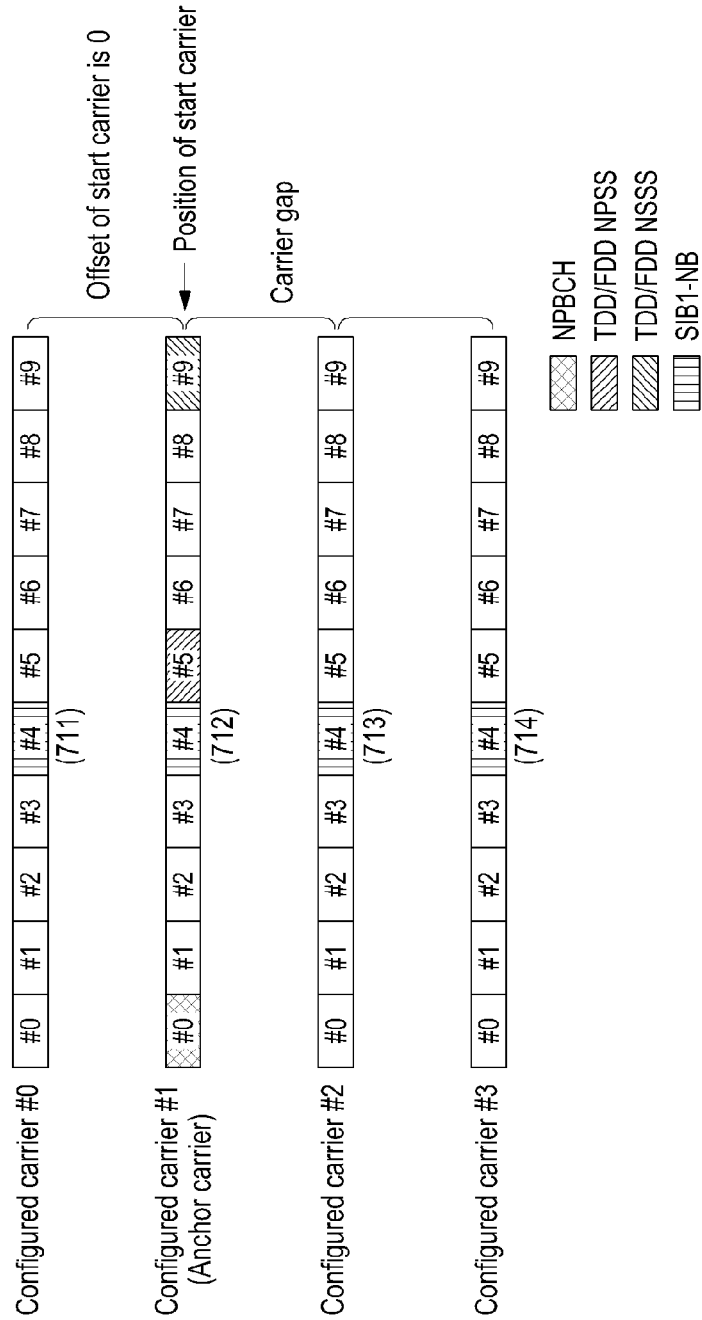
[Fig. 7A]

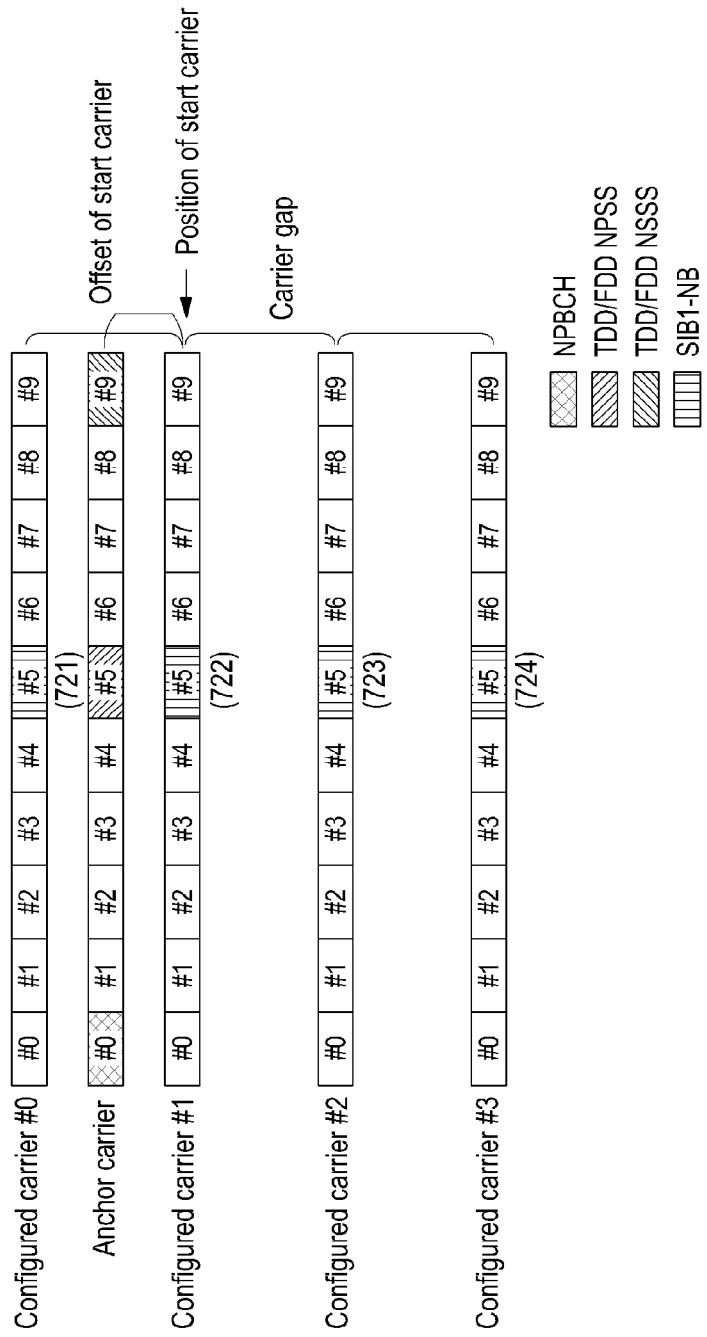
[Fig. 7B]

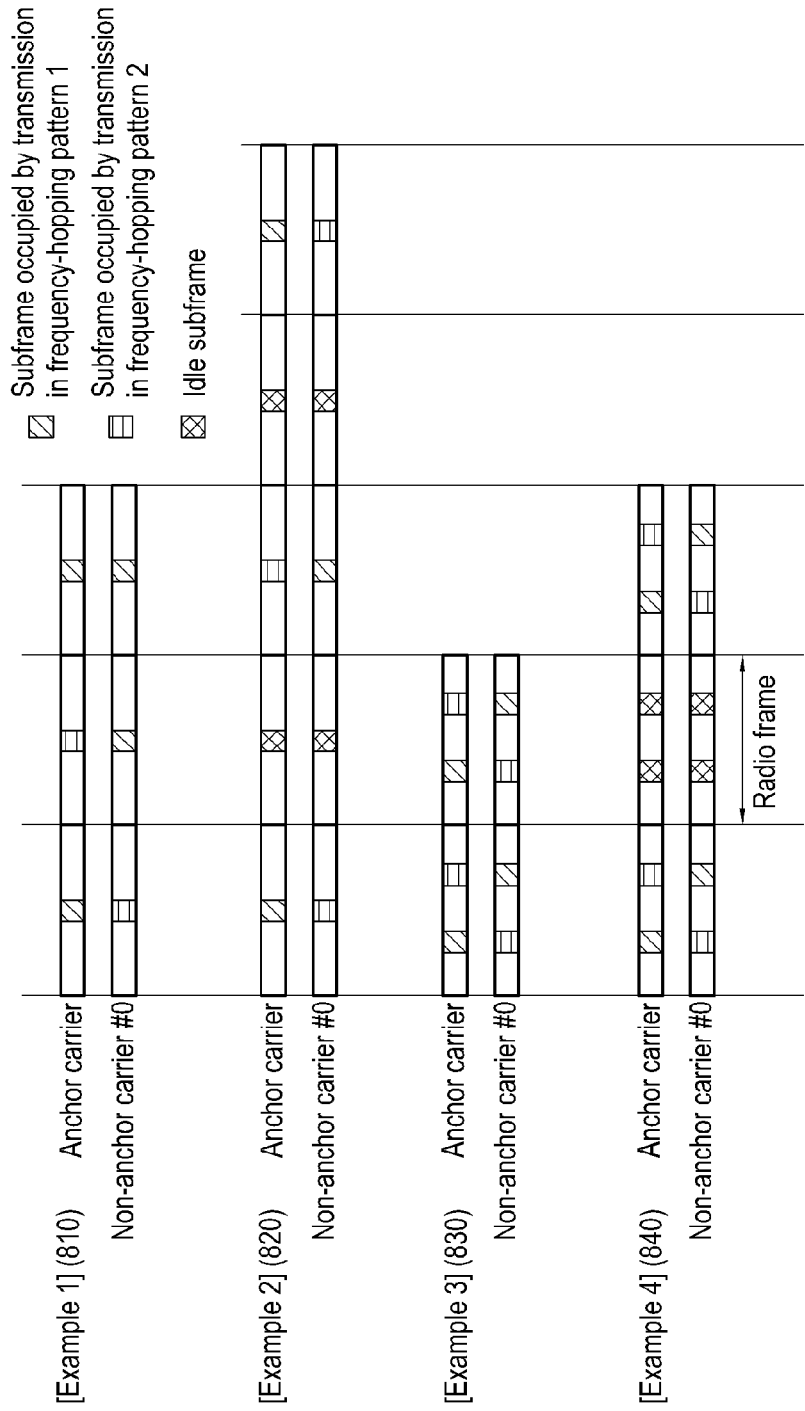
[Fig. 8]

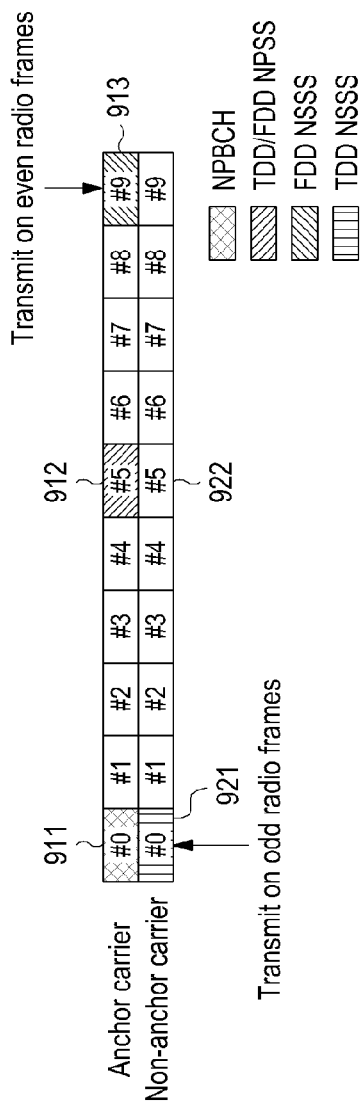
[Fig. 9]

[Fig. 10]
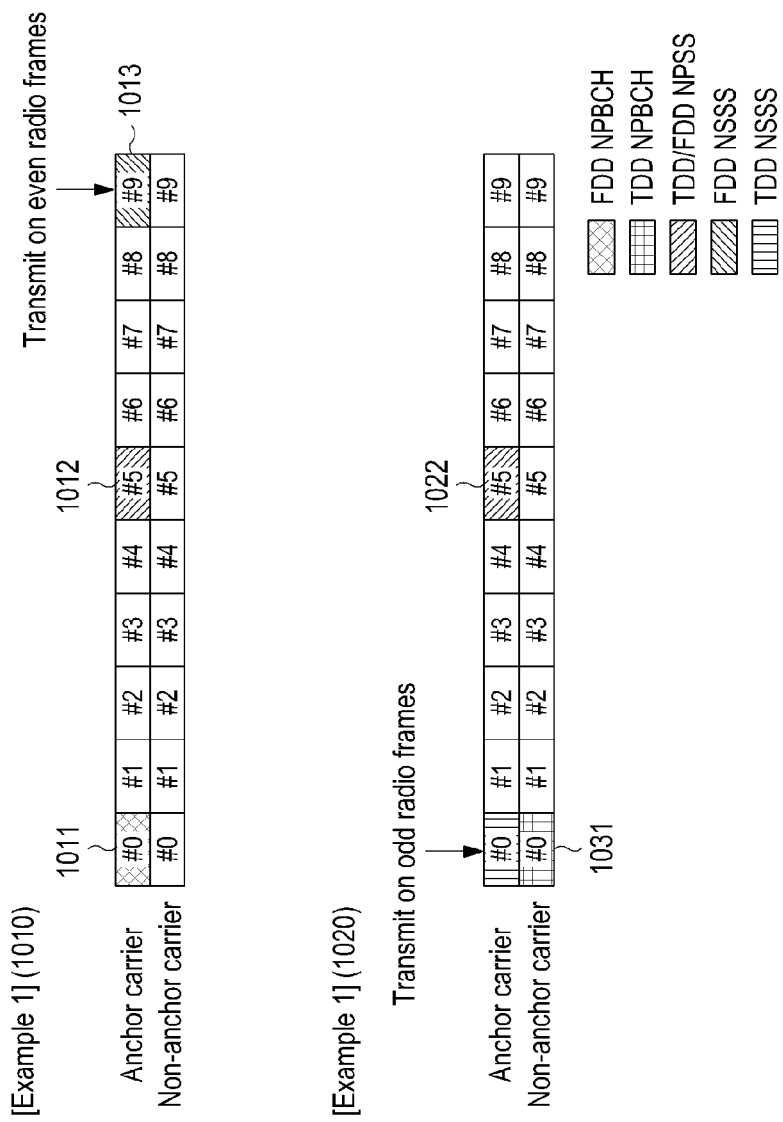

[Fig. 11]
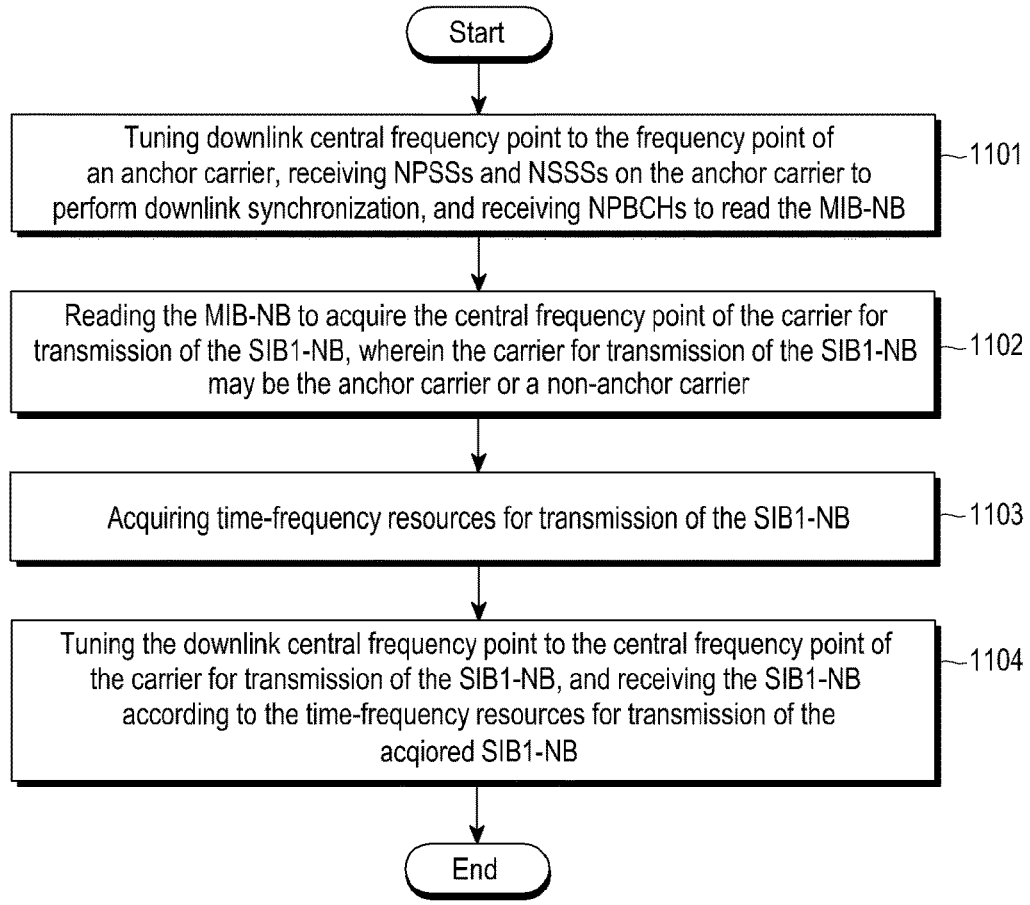
[Fig. 12]
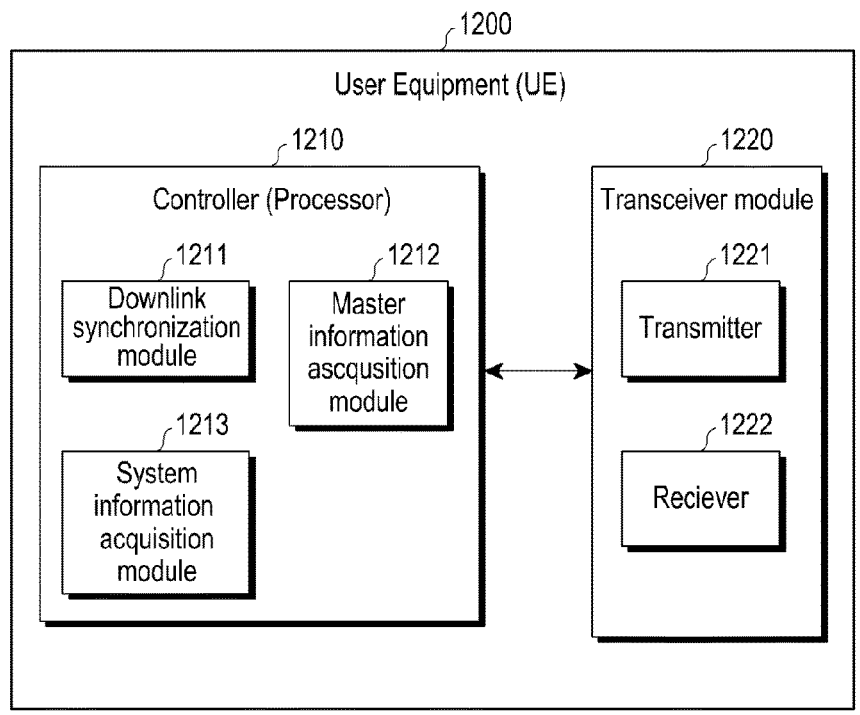

[Fig. 13]
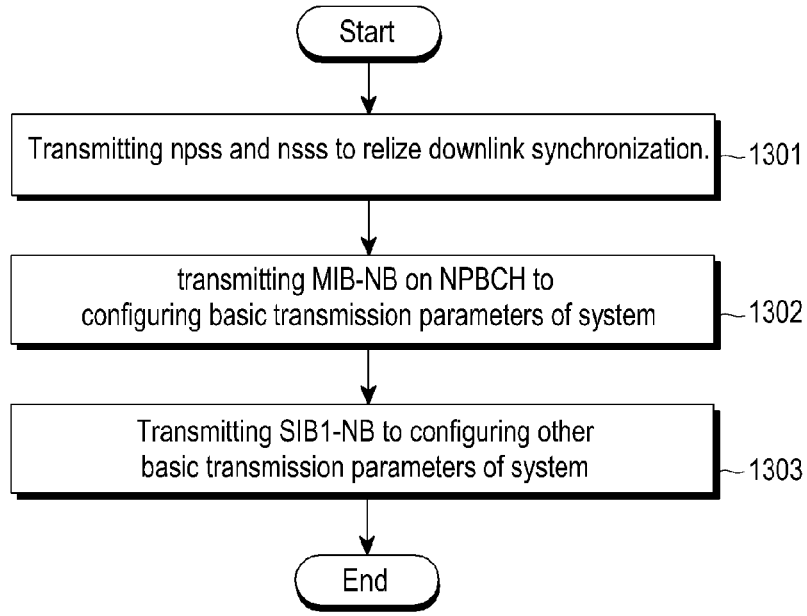
[Fig. 14]
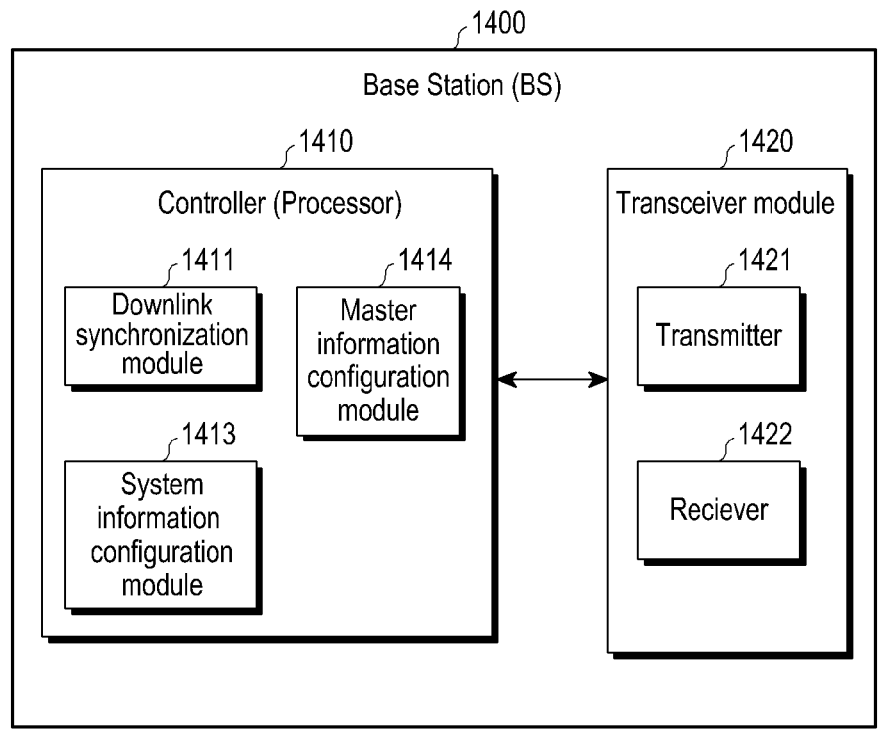

METHOD AND USER EQUIPMENT FOR ACCESS TO NARROWBAND INTERNET OF THINGS (NB IOT)

CROSS-REFERENCE TO RELATED APPLICATIONS

This application is a 371 of International Application No. PCT/KR2018/004208 filed on Apr. 10, 2018, which claims priority to Chinese Patent Application No. 201710229636.7 filed on Apr. 10, 2017, Chinese Patent Application No. 201710671248.4 filed on Aug. 8, 2017, Chinese Patent Application No. 201711138388.1 filed on Nov. 16, 2017, and Chinese Patent Application No. 201810142604.8 filed on Feb. 11, 2018, the disclosures of which are herein incorporated by reference in their entirety.

BACKGROUND

1. Field

The present disclosure relates to wireless communication technology and in particular to a method and user equipment for access to the NarrowBand Internet of Things (NB IoT).

2. Description of Related Art

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The NB IoT technology defines wireless access to cellular IoT. It highly depends upon non-backward-compatible E-UTRA, enhances extreme coverage scene, and supports a huge number of low-rate IoT terminals. It has low latency sensitivity, equipment with ultra-low cost and power consumption, and optimized network architectures. The NB IoT system supports total three operation modes: (1) stand-alone operation mode in which the spectrum occupied by the GERAN system is recultivated and one or more GSM carriers are used; (2) in-band operation mode, in the LTE bandwidth, in which one or more physical resource blocks (PRBs) for LTE are used; and (3) guard-band operation mode, in the guard bandwidth for the LTE system, in which one or more 200 kHz idle spectrum resources are used.

The existing versions R13 and R14 of the NB IoT technology support only Frequency Division Duplex (FDD) mode, not Time Division Duplex (TDD) mode. In the FDD scene, the anchor carriers are paired uplink and downlink frequency points, and there are more successive and sufficient uplink and downlink subframes within one radio frame. While in the TDD scene, the anchor carriers uplink and downlink use the same frequency point, and the subframes within one radio frame are divided into uplink, downlink and special subframes. In the existing system design, the subframes for transmitting the primary and secondary synchronization signals, the broadcast channels and the Narrowband System Information Block Type 1 (SIB1-NB) are fixed by specification. Therefore, the existing design cannot be directly reused in the TDD scene. For example, it is fixed by specification that the existing SIB1-NB is transmitted on subframe 4 while the TDD NB IoT design in the in-band operation mode has to follow the uplink and downlink subframe configuration for the LTE system. Therefore, subframe 4 is not necessarily a downlink subframe. Table 1 shows the uplink and downlink subframe configuration for the LTE system. Additionally, in the existing design, the anchor carriers are heavily loaded in transmitting common signaling in uplink and downlink. Taking downlink for example, the primary and secondary synchronization signals, the broadcast channels, the system information, the common signaling and the control channels can be transmitted on the anchor carriers only. And, due to the limited bandwidth of the NB IoT system, downlink does not support frequency division multiplexing between physical channels or between multiple users, and all physical channels are transmitted on different subframes in a time division multiplexing manner. However, for TDD, there are a limited number of downlink subframes in one radio frame. Therefore, the existing system design cannot meet the transmission requirements and thus cannot be applied to the TDD scene.

TABLE 1

Uplink and downlink subframe configuration for the LTE system

| Uplink and downlink subframe configuration | Subframe No. | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Accordingly, it is necessary to provide a method and user equipment for access to NB IoT, by which the above technical problems can be solved.

SUMMARY

Due to the limited bandwidth of the NB IoT system, downlink does not support frequency division multiplexing between physical channels or between multiple users, and all physical channels are transmitted on different subframes in a time division multiplexing manner. However, for TDD, there are a limited number of downlink subframes in one radio frame. Therefore, the existing system design cannot meet the transmission requirements and thus cannot be applied to the TDD scene.

Accordingly, it is necessary to provide a method and user equipment for access to NB IoT, by which the above technical problems can be solved.

An objective of the present disclosure is to provide a method and user equipment for access to NB IoT, which can be adapted to TDD mode, in order to overcome the deficiencies in the prior art.

For this purpose, the present disclosure provides a method for access to NB IoT comprising the following steps of: detecting a narrowband primary synchronization signal (NPSS) and a narrowband secondary synchronization signal (NSSS) to realize downlink synchronization; detecting a narrowband physical broadcast channel (NPBCH) to acquire Narrowband Master Information Block (MIB-NB) information; and acquiring Narrowband System Information Block Type 1 (SIB1-NB) according to the MIB-NB information, wherein at least one of the NPSS, the NSSS, the MIB-NB and the SIB1-NB is transmitted on a non-anchor carrier.

After the acquiring SIB1-NB information according to the MIB-NB information, the method comprises a acquiring other Narrowband System Information Blocks (SIBs-NB) information according to the SIB1-NB information and/or the MIB-NB information, the other SIBs-NB comprising a number of SIBs-NB other than the SIB1-NB, at least one of the other SIBs-NB being transmitted on an anchor carriers or a non-anchor carrier.

The detecting a NPSS and a NSSS to realize downlink synchronization comprises: detecting a NPSS and a NSSS to realize downlink synchronization, and determining a system duplex mode according to physical resources used by the NPSS and/or NSSS; and the detecting a NPBCH to acquire MIB-NB information comprises: detecting, according to the determined system duplex mode, a NPBCH on corresponding time-domain and/or frequency-domain resource to acquire MIB-NB information.

The physical resources comprise at least one of time-domain resources, frequency-domain resources and sequence resources.

The detecting, according to the determined system duplex mode, a NPBCH on corresponding frequency-domain resource to acquire MIB-NB information comprises: detecting a NPBCH on an anchor carrier to acquire MIB-NB information if the determined system duplex mode is Frequency Division Duplex (FDD); detecting a NPBCH on a non-anchor carrier to acquire MIB-NB information if the determined system duplex mode is Time Division Duplex (TDD).

The acquiring SIB1-NB information according to the MIB-NB information comprises: acquiring SIB1-NB information according to SIB1-NB resource allocation information contained in the MIB-NB.

The SIB1-NB resource allocation information comprises position information of one or more subframes for transmitting the SIB1-NB, and/or position information of one or more carriers for transmitting the SIB1-NB; or the SIB1-NB resource allocation information comprises an offset of a start carrier from an anchor carrier, the index of the start carrier, the number of carriers, and a carrier gap.

The acquiring other SIBs-NB information according to the SIB1-NB information and/or the MIB-NB information comprises: acquiring corresponding other SIBs-NB information according to other SIBs-NB resource allocation information contained in the SIB1-NB and/or according to system information about other IBs-NB resource allocation contained in the MIB-NB.

The other SIBs-NB resource allocation information comprises position information of one or more subframes for transmitting other SIBs-NB, and/or position information of one or more carriers for transmitting other SIBs-NB; or the other SIBs-NB resource allocation information comprises an offset of a start carrier from an anchor carrier, the index of the start carrier, the number of carriers, and a carrier gap.

The system information about other IBs-NB resource allocation is uplink and downlink subframe configuration information.

For this purpose, the present disclosure further provides a user equipment for access to NB IoT comprising: a downlink synchronization module for detecting a NPSS and a NSSS to realize downlink synchronization; a master information acquisition module for detecting a NPBCH to acquire Narrowband Master Information Block (MIB-NB) information; and a system information acquisition module for acquiring Narrowband System Information Block Type 1 (SIB1-NB) according to the MIB-NB information, wherein at least one of the NPSS, the NSSS, the MIB-NB and the SIB1-NB is transmitted on a non-anchor carrier.

For this purpose, the present disclosure further provides a method for configuring access to NB IoT comprising the following steps of: transmitting a NPSS and a NSSS to realize downlink synchronization; transmitting Narrowband Master Information Block (MIB-NB) on a NPBCH to configure basic transmission parameters of a system; and transmitting Narrowband System Information Block Type 1 (SIB1-NB) to configure other basic transmission parameters of the system, wherein at least one of the NPSS, the NSSS, the MIB-NB and the SIB1-NB is transmitted on a non-anchor carrier.

For this purpose, the present disclosure further provides a base station equipment for configuring access to NB IoT comprising: a downlink synchronization module for transmitting a NPSS and a NSSS to realize downlink synchronization; a master information configuration module for transmitting Narrowband Master Information Block (MIB-NB) on a NPBCH to configure basic transmission parameters of a system; and a system information configuration module for transmitting Narrowband System Information Block Type 1 (SIB1-NB) to configure other basic transmission parameters of the system, wherein at least one of the NPSS, the NSSS, the MIB-NB and the SIB1-NB is transmitted on a non-anchor carrier.

The present disclosure has the following technical effects: the frequency-domain transmission resources for the NPSS, the NSSS, the MIB-NB and the SIB1-NB are extended from anchor carriers to non-anchor carriers, which can significantly reduce the load of the anchor carriers and enable the existing NB IoT to operate in Time Division Duplex (TDD) mode, thereby attaining higher usage of spectrum resources, and significantly improving the system throughput and the connection efficiency of the NB IoT system in the case of having a huge number of users connected.

BRIEF DESCRIPTION OF THE DRAWINGS

To describe the technical solutions of the embodiments of the present disclosure more clearly, drawings to be used for the description of the embodiments will be briefly introduced below. Apparently, the drawings to be described below show merely some embodiments of the present disclosure. Other drawings may be obtained according to those drawings by a person of ordinary skill in the art without paying any creative effort.

FIG. 1 is a flowchart of a method for access to NB IoT, according to the present disclosure;

FIG. 2 is a flowchart of a solution for access to NB IoT, according to Embodiment 1 of the present disclosure;

FIG. 3 is a schematic diagram of configuring anchor carriers to transmit NPSSs, NSSSs and NPBCHs, according to the present disclosure;

FIG. 4 is a schematic diagram of implicitly indicating SIB1-NB resource configuration, according to the present disclosure;

FIG. 5 is a flowchart of a solution for access to NB IoT, according to Embodiment 2 of the present disclosure;

FIG. 6 is a schematic diagram of determining positions of multiple carriers for frequency-hopping transmission of physical channels based on a rule, according to the present disclosure;

FIG. 7A and FIG. 7B are schematic diagrams of determining SIB1-NB resources based on carrier configuration information, according to the present disclosure;

FIG. 8 is a schematic diagram of patterns of frequency-hopping transmission of a downlink physical channel on multiple carriers, according to the present disclosure;

FIG. 9 is a schematic diagram of a method for determining, by a UE, a system duplex mode based on the NSSS, according to the present disclosure;

FIG. 10 is a schematic diagram of another method for determining, by a UE, a system duplex mode based on the NSSS, according to the present disclosure;

FIG. 11 is a flowchart illustrating a process of acquiring the time-frequency resources for transmission of the SIB1-NB, according to the present disclosure;

FIG. 12 is a block diagram of modules of a user equipment for access to NB IoT, according to the present disclosure;

FIG. 13 is a flowchart of a method for configuring access to NB IoT, according to the present disclosure; and FIG. 14 is a block diagram of modules of a base station equipment for configuring access to NB IoT, according to the present disclosure.

DETAILED DESCRIPTION

To make those skilled in the art better understand the technical solutions of the present disclosure, the technical solutions in the embodiments of the present disclosure will be described in detail below with reference to the accompanying drawings.

In some flows as described in the description, claims and drawings of the present disclosure, many operations are contained which occur in a specific order. However, it should be appreciated that those operations may not be performed in the order as described herein or may be performed concurrently. The serial numbers of the operations, for example, 101, 102, etc., are merely used for distinguishing between the various operations, and the serial number itself does not represent any execution order. In addition, those flows may include more or less operations and those operations can be performed sequentially or concurrently.

The technical solutions in the embodiments of the present disclosure will be described in detail below with reference to the accompanying drawings. Apparently, the described embodiments are merely some but not all of the embodiments of the present disclosure. All other embodiments obtained by a person of ordinary skill in the art, without paying any creative effort, on the basis of the embodiments of the present disclosure shall fall into the protection scope of the present disclosure.

Referring to FIG. 1, a method for access to Narrowband Internet of Things (NB IoT), by a user equipment (UE) or terminal, according to the present disclosure comprises the following steps:

step 101: detecting a NPSS and a NSSS to realize downlink synchronization;

step 102: detecting a NPBCH to acquire Narrowband Master Information Block (MIB-NB) information; and step 103: acquiring Narrowband System Information Block Type 1 (SIB1-NB) according to the MIB-NB information, wherein at least one of the NPSS, the NSSS, the MIB-NB and the SIB1-NB is transmitted on a non-anchor carrier.

Embodiment 1

Referring to FIG. 2, in this embodiment, a solution for implementing a Narrowband Internet of Things (NB IoT) system in which the duplex mode is transparent to a User Equipment (UE) will be introduced.

Step 201: A UE performs cell search, and receives, on fixed subframes of anchor carriers meeting the channel raster, a Narrowband Primary Synchronization Signal (NPSS) and a Narrowband Secondary Synchronization Signal (NSSS), which are transmitted by a base station, to realize downlink synchronization; and after the downlink synchronization is completed, the UE receives a Narrowband Physical Broadcast Channel (NPBCH) on a fixed subframe.

Referring to FIG. 3, for example, the UE receives a NPSS on subframe #5 (320), receives a NSSS on subframe #9 (330), and receives a NPBCH on subframe #0 (310). In this case, from the system side, the TDD-enabled LTE system does not support configuration of a NB IoT system in the in-band operation mode in the uplink and downlink subframe configuration 0 (see Table 1).

Step 202: According to MIB-NB indication carried in the NPBCH transmitted by the base station (reading resource allocation information in the MIB-NB), the UE acquires time-frequency resources for the SIB1-NB and receives the SIB1-NB on the time-frequency resources. The manner in which the MIB-NB indicates the time-frequency resources used by the SIB1-NB can be explicit indication, or implicit indication in conjunction with a certain rule. Here, the frequency domain resources comprise one or more carriers which can be anchor carriers or non-anchor carriers.

For example, the explicit indication manner may be as follows: time-domain resource and frequency-domain resource for transmission of the SIB1-NB are simultaneously indicated in the MIB-NB. Additionally, the time-domain resource may be indicated by the MIB-NB while the frequency-domain resource may be predetermined by specification; or, the frequency-domain resource may be indicated by the MIB-NB while the time-domain resource may be predetermined by specification.

The manner of indicating, by the MIB-NB, the time-domain resource for transmission of the SIB1-NB may be indication of subframe indexes. As one implementation, a set of subframes available for transmission of the SIB1-NB is predetermined by specification, and the MIB-NB indicates one or more subframes in the set of subframes to be used for transmission of the SIB1-NB. The set of subframes available for transmission of the SIB1-NB may contain all or part of the subframes in one radio frame. A method for determining, by the UE, the subframe(s) used for transmission of the SIB1-NB may be as follows: the UE reads the indication field in the MIB-NB to acquire a unique subframe used for transmission of the SIB1-NB, wherein, for example, the MIB-NB indicates with 2 bits that the subframe for transmission of the SIB1-NB is one of {subframe #0, subframe #4, subframe #8}, or the MIB-NB indicates with 1 bit that the subframe for transmission of the SIB1-NB is one of {subframe #0, subframe #4} and the set of subframes may also be {subframe #0, subframe #8} or {subframe #0, subframe #6}. Specifically, if the MIB-NB indicates that the unique subframe for transmission of the SIB1-NB is subframe #0, the SIB1-NB may be transmitted on subframe #0 of each odd radio frame only; if the MIB-NB indicates that the unique subframe for transmission of the SIB1-NB is a subframe other than subframe #0, for example, subframe #4, the SIB1-NB may be transmitted on subframe #4 of each radio frame. The index of the specific radio frame for transmission of the SIB1-NB may be determined according to both the unique identification code of the cell and the number of times of repetition, as shown in Table 2.

The method for determining, by the UE, the subframe(s) used for transmission of the SIB1-NB may also be as follows: the UE reads the indication field in the MIB-NB to acquire the number of subframes used for transmission of the SIB1-NB and the indexes of the subframes, wherein the number of the subframes may be one or more and, for example, the MIB-NB indicates with 1 bit that subframe #0 is the subframe for transmission of the SIB1-NB or both subframe #0 and subframe #4 are the subframes for transmission of the SIB1-NB. In the case that the SIB1-NB is transmitted on multiple subframes, the transmission manner may be as follows: the SIB1-NB is transmitted on multiple subframes of the same radio frame (taking transmission of the SIB1-NB on subframe #0 and subframe #4 for example, as one detailed implementation, the SIB1-NB may be transmitted on both subframe #0 and subframe #4 of a same radio frame); or, for respective radio frames the indicated subframes are alternately used, and only one subframe of a same radio frame is used for transmission of the SIB1-NB (taking transmission of the SIB1-NB on subframe #0 and subframe #4 for example, as one detailed implementation, the SIB1-NB may be transmitted on subframe #0 of each odd radio frame and on subframe #4 of each even radio frame). The manner of transmitting the SIB1-NB on multiple subframes may be configured by the system or fixedly selected by specification. Additionally, the two manners of transmitting the SIB1-NB on multiple subframes may be combined. As one detailed implementation, the SIB1-NB may be transmitted on both subframe #0 and a downlink subframe other than subframe #0 of each odd radio frame and on subframe #0 of each even radio frame. Further, the index of the downlink subframe other than subframe #0 may be indicated by the MIB-NB. For example, the MIB-NB indicates with 1 bit that the downlink subframe other than subframe 0 for transmission of the SIB1-NB is subframe #4 or subframe #8, or the MIB-NB indicates with 1 bit that the downlink subframe other than subframe #0 for transmission of the SIB1-NB is subframe #4 or subframe #6.

The method for determining, by the UE, a subframe used for transmission of the SIB1-NB may also be as follows: the UE reads indication of the MIB-NB to acquire indexes of multiple subframes available for transmission of the SIB1-NB, and then acquires an index of a subframe actually used for transmission of the SIB1-NB according to the unique identification code of the cell. For example, the MIB-NB indicates with 1 bit that the subframes available for transmission of the SIB1-NB are one of {subframe #0 and subframe #4, subframe #0 and subframe #8} or one of {subframe #0 and subframe #4, subframe #0 and subframe #6}. Specifically, taking for example that the MIB-NB indicates the subframes available for transmission of the SIB1-NB are subframe #0 and subframe #4, the UE further determines a subframe actually used for transmission of the SIB1-NB according to the unique identification code of the cell. Table 2 shows an instance of start radio frames and radio subframes for actually transmitting the SIN1-NB, acquired by the UE.

The above preferred manners may be combined, and the number of bits of an indication field may be extended.

TABLE 2

| The number of times of NPDSCH repetition | $N_{ID}^{Ncell}$ (unique identification code of the cell) | Start radio frame for repetitive transmission of the SIB1-NB (nf mod 256) | Radio subframe used for transmission of the SIB1-NB |
|---|---|---|---|
| 4 | $N_{ID}^{Ncell}$ mod 4 = 0 | 0 | 4 |
|  | $N_{ID}^{Ncell}$ mod 4 = 1 | 16 | 4 |
|  | $N_{ID}^{Ncell}$ mod 4 = 2 | 32 | 4 |
|  | $N_{ID}^{Ncell}$ mod 4 = 3 | 48 | 4 |
| 8 | $N_{ID}^{Ncell}$ mod 2 = 0 | 0 | 4 |
|  | $N_{ID}^{Ncell}$ mod 2 = 1 | 16 | 4 |
| 16 | $N_{ID}^{Ncell}$ mod 2 = 0 | 0 | 4 |
|  | $N_{ID}^{Ncell}$ mod 2 = 1 | 1 | 0 |

The manner of indicating, by the MIB-NB, the frequency-domain resource for transmission of the SIB1-NB may be indicated by an offset between a carrier used for transmission of the SIB1-NB and the anchor carrier, wherein the system specifies a set of carriers available for transmission of the SIB1-NB and the MIB-NB indicates one or more carriers thereof used for transmission of the SIB1-NB. The one or more carriers indicated by the MIB-NB may contain the anchor carrier and/or a non-anchor carrier. If multiple carriers are assigned, the manner of transmission of the SIB1-NB may be frequency-hopping transmission between multiple carriers (refer to Embodiment 3 for detailed implementation). The system may specify in various ways the set of carriers available for transmission of the SIB1-NB. As an instance, the non-anchor carrier assignable for transmission of the SIB1-NB may be set as a carrier left adjacent to the anchor carrier or right adjacent to the anchor carrier, and the MIB-NB indicates with 1 bit whether the carrier is left adjacent to the anchor carrier or right adjacent to the anchor carrier, i.e., whether (+)180 kHz or (−)180 kHz from the center frequency of the anchor carrier, or the MIB-NB indicates with 1 bit whether (+)200 kHz or (+)200 kHz from the center frequency of the anchor carrier. Table 3 shows an example of the indication field. In particular, the UE may determine an absolute frequency offset between the non-anchor carrier for transmission of the SIB1-NB and the central frequency point of the anchor carrier according to the operation mode. For example, when the UE obtains that the operation mode is the stand-alone operation mode, the absolute frequency offset is 200 kHz; when the UE obtains that the operation mode is the in-band operation mode and/or the guard-band operation mode, the absolute frequency offset is 180 kHz. In the guard-band operation mode, there may be other manners of acquiring a frequency point of the non-anchor carrier for transmission of the SIB1-NB, as described below. If there are more carriers assignable for transmission of the SIB1-NB, the indication field can be extended and Table 4 shows another example of the indication field; the indication field can also indicate that there are one or more carriers assigned for transmission of the SIB1-NB, and Table 5 shows another example of the indication field; the examples shown in Table 4 and Table 5 can be combined with each other, and Table 6 shows an example of the combination. Additionally, the MIB-NB may indicate with 2 bits that the carrier for transmission of the SIB1-NB is one of {the anchor carrier, a carrier left adjacent to (or right adjacent to) the anchor carrier, the anchor carrier and a carrier left adjacent to the anchor carrier, the anchor carrier and a carrier right adjacent to the anchor carrier}. Actually, when a non-anchor carrier is assigned for some scenes, a carrier adjacent to the anchor carrier cannot be used for transmission of the SIB1-NB, and one or more states in the carrier indication field of the MIB-NB may be reserved to indicate that the non-anchor carrier is a carrier having a fixed frequency offset from the anchor carrier. Taking Table 5 for example, the indication field of the MIB-NB is so extended to obtain Table 7. Other examples shown in Table 3 to Table 6 can also be extended similarly. More specifically, in the example shown in Table 7, the value "11" of the SIB1-NB carrier indication field in the MIB-NB is valid, if the operation mode is guard-band operation mode, to indicate the frequency-domain position of the non-anchor carrier used for multi-carrier transmission of the SIB1-NB in the bandwidth for a specific LTE system. For example, when the bandwidth for the LTE system is 5 MHz and the anchor carrier is in a left sideband (or a right sideband) of the LTE guard-band, the base station configures the value of the indication field as "11", and the UE determines a carrier having a frequency offset $+F_{5M}$ (or $-F_{5M}$) from the anchor carrier as the non-anchor carrier for transmission of the SIB1-NB, where $+F_{5M}$ is a fixed value for the system. In this case, the non-anchor carrier is in a sideband of the LTE guard-band different from the anchor carrier. It is to be noted that, unless specially specified (for example, the value of the indication field is "11" in Table 7), all examples in Table 3 to Table 7 are applicable to all operation modes including the stand-alone operation mode, the in-band operation mode and the guard-band operation mode.

TABLE 3

| SIB1-NB carrier indication field in the MIB-NB | Carrier used for transmission of the SIB1-NB |
| --- | --- |
| 0 | Carrier left adjacent to the anchor carrier (non-anchor carrier having −180 kHz or −200 kHz from the center frequency of the anchor carrier) |
| 1 | Carrier right adjacent to the anchor carrier (non-anchor carrier having +180 kHz or +200 kHz from the center frequency of the anchor carrier) |

TABLE 4

| SIB1-NB carrier indication field in the MIB-NB | Carrier used for transmission of the SIB1-NB |
| --- | --- |
| 00 | Anchor carrier |
| 01 | Carrier left adjacent to the anchor carrier (non-anchor carrier having −180 kHz or −200 kHz from the center frequency of the anchor carrier) |
| 10 | Carrier right adjacent to the anchor carrier (non-anchor carrier having +180 kHz or +200 kHz from the center frequency of the anchor carrier) |

TABLE 5

| SIB1-NB carrier indication field in the MIB-NB | Carrier used for transmission of the SIB1-NB |
| --- | --- |
| 00 | Anchor carrier |
| 01 | Multi-carrier transmission: anchor carrier and non-anchor carrier left adjacent to the anchor carrier (−180 kHz or −200 kHz from the center frequency of the anchor carrier) |
| 10 | Multi-carrier transmission: anchor carrier and non-anchor carrier right adjacent to the anchor carrier (+180 kHz or +200 kHz from the center frequency of the anchor carrier) |

TABLE 6

| SIB1-NB carrier indication field in the MIB-NB | Carrier used for transmission of the SIB1-NB |
| --- | --- |
| 00 | Anchor carrier |
| 01 | Carrier left adjacent to the anchor carrier (non-anchor carrier having −180 kHz or −200 kHz from the center frequency of the anchor carrier) |
| 10 | Carrier right adjacent to the anchor carrier (non-anchor carrier having +180 kHz or +200 kHz from the center frequency of the anchor carrier) |
| 11 | Multi-carrier transmission: anchor carrier and non-anchor carrier left adjacent to the anchor carrier (−180 kHz or −200 kHz from the center frequency of the anchor carrier) |

TABLE 7

| SIB1-NB carrier indication field in the MIB-NB | Carrier used for transmission of the SIB1-NB |
|---|---|
| 00 | Anchor carrier |
| 01 | Multi-carrier transmission: anchor carrier and non-anchor carrier left adjacent to the anchor carrier (−180 kHz or −200 kHz from the center frequency of the anchor carrier) |
| 10 | Multi-carrier transmission: anchor carrier and non-anchor carrier right adjacent to the anchor carrier (+180 kHz or +200 kHz from the center frequency of the anchor carrier) |
| 11 | Multi-carrier transmission: anchor carrier and non-anchor carrier having a fixed frequency offset from the anchor carrier |

Actually, in the above examples, the non-anchor carrier for transmission of the SIB1-NB is not limited to a carrier adjacent to the anchor carrier, and other non-anchor carrier configuration may also be used. For example, a non-anchor carrier having a positive or negative frequency offset from the anchor carrier may be used as a replacement in the examples of Table 3 to Table 7. The frequency offset between the anchor carrier and the non-anchor carrier may be a fixed frequency offset (when the frequency offset is ±180 kHzkHz, the non-anchor carrier is a carrier adjacent to the anchor carrier), or the specific value of the frequency offset may be configured by the MIB-NB. As an instance of the specific value of the frequency offset being configured by the MIB-NB, in the guard-band operation mode, the non-anchor carrier used for transmission of the SIB1-NB may be configured to be in the LTE guard-band different from the anchor carrier. The frequency offset between the non-anchor carrier and the anchor carrier is related to the bandwidth of the LTE system. It can indicate the absolute frequency offset between the non-anchor carrier and the anchor carrier by indicating the bandwidth for the LTE system in the MIB-NB. Tables 8 and 9 show two manners of indicating the absolute frequency offset between the non-anchor carrier and the anchor carrier, respectively. The UE needs to acquire the carrier assignment for transmission for the SIB1-NB with reference to the content indicated by Table 3 to Table 9, wherein "carrier left adjacent to the anchor carrier" and "carrier right adjacent to the anchor carrier" in Table 3 to Table 7 are replaced with "carrier having a frequency point lower than the anchor carrier" and "carrier having a frequency point higher than the anchor carrier", respectively. Specifically, taking Table 6 and Table 9 for example, if the base station configures the value of the SIB1-NB carrier indication field in Table 6 as "01", the unique carrier used for transmission of the SIB1-NB is a non-anchor carrier having a frequency point lower than the anchor carrier. The UE further reads the indication field for the frequency-domain offset of the non-anchor carrier used for transmission the SIB1-NB in Table 9. Assuming that the value of the indication field is "10", the absolute frequency-domain offset between the non-anchor carrier and the anchor carrier is $\Delta F_{15M}$, and the frequency point of the non-anchor carrier is $F_{anchor} - \Delta F_{15M}$, where $F_{anchor}$ is the frequency point of the anchor carrier. If the value of the SIB1-NB carrier indication field is "00", the carrier used for transmission of the SIB1-NB is the anchor carrier.

TABLE 8

| Indication field for frequency-domain offset (absolute value) of non-anchor carrier used for transmission of the SIB1-NB in the MIB-NB | Absolute frequency-domain offset between non-anchor carrier used for transmission of the SIB1-NB and anchor carrier |
|---|---|
| 00 | Bandwidth for the LTE system is 5 MHz, and corresponding frequency offset between anchor carrier and non-anchor carrier is a fixed value, denoted by $\Delta F_{5M}$. |
| 01 | Bandwidth for the LTE system is 10 MHz, and corresponding frequency offset between anchor carrier and non-anchor carrier is a fixed value, denoted by $\Delta F_{10M}$. |
| 10 | Bandwidth for the LTE system is 15 MHz, and corresponding frequency offset between anchor carrier and non-anchor carrier is a fixed value, denoted by $\Delta F_{15M}$. |
| 11 | Bandwidth for the LTE system is 20 MHz, and corresponding frequency offset between anchor carrier and non-anchor carrier is a fixed value, denoted by $\Delta F_{20M}$. |

TABLE 9

| Indication field for frequency-domain offset (absolute value) of non-anchor carrier used for transmission of the SIB1-NB in the MIB-NB | Absolute frequency-domain offset between non-anchor carrier used for transmission of the SIB1-NB and anchor carrier |
|---|---|
| 00 | Frequency offset between anchor carrier and non-anchor carrier is a fixed value, denoted by $\Delta F_{default}$, wherein non-anchor carrier is a carrier adjacent to anchor carrier if $\Delta F_{default}$ is 180 kHz. |
| 01 | Bandwidth for the LTE system is 10 MHz, and corresponding frequency offset between anchor carrier and non-anchor carrier is a fixed value, denoted by $\Delta F_{10M}$. |
| 10 | Bandwidth for the LTE system is 15 MHz, and corresponding frequency offset between anchor carrier and non-anchor carrier is a fixed value, denoted by $\Delta F_{15M}$. |
| 11 | Bandwidth for the LTE system is 20 MHz, and corresponding frequency offset between anchor carrier and non-anchor carrier is a fixed value, denoted by $\Delta F_{20M}$. |

In addition to the above instances of the position of the non-anchor carrier being configured by the MIB-NB in the guard-band operation mode, there may be another instance as shown in Table 10. When the operation mode of the system is the guard-band operation mode, the UE may directly read a SIB1-NB carrier indication field of 3 bits from the MIB-NB to obtain the specific position of the carrier used for transmission of the SIB1-NB.

TABLE 10

| SIB1-NB transmission carrier indication field in the MIB-NB | Carried used for transmission of the SIB1-NB |
|---|---|
| 000 | Anchor carrier |
| 001 | Bandwidth for the LTE system is 5 MHz; and frequency-hopping transmission on anchor carrier and non-anchor carrier having a frequency point of $F_{anchor} - \Delta F_{5M}$ |

TABLE 10-continued

| SIB1-NB transmission carrier indication field in the MIB-NB | Carried used for transmission of the SIB1-NB |
|---|---|
| | (or $F_{anchor} + \Delta F_{5M}$) is performed, or transmission only on non-anchor carrier having a frequency point of $F_{anchor} - \Delta F_{5M}$ (or $F_{anchor} + \Delta F_{5M}$) is performed, where $F_{anchor}$ is the frequency point of the anchor carrier and $\Delta F_{5M}$ is a fixed value related to the system bandwidth. |
| 010 | Bandwidth for the LTE system is 10 MHz; and transmission on anchor carrier and non-anchor carrier having a frequency point of $F_{anchor} - \Delta F_{10M}$ is performed, or transmission only on non-anchor carrier having a frequency point of $F_{anchor} - \Delta F_{10M}$ is performed, where $F_{anchor}$ is the frequency point of the anchor carrier and $\Delta F_{10M}$ is a fixed value related to the system bandwidth. |
| 011 | Bandwidth for the LTE system is 10 MHz; and transmission on anchor carrier and non-anchor carrier having a frequency point of $F_{anchor} + \Delta F_{10M}$ is performed, or transmission only on non-anchor carrier having a frequency point of $F_{anchor} + \Delta F_{10M}$ is performed, where $F_{anchor}$ is the frequency point of the anchor carrier and $\Delta F_{10M}$ is a fixed value related to the system bandwidth. |
| 100 | Bandwidth for the LTE system is 15 MHz; and transmission on anchor carrier and non-anchor carrier having a frequency point of $F_{anchor} - \Delta F_{15M}$ is performed, or transmission only on non-anchor carrier having a frequency point of $F_{anchor} - \Delta F_{15M}$ is performed, where $F_{anchor}$ is the frequency point of the anchor carrier and $\Delta F_{15M}$ is a fixed value related to the system bandwidth. |
| 101 | Bandwidth for the LTE system is 15 MHz; and transmission on anchor carrier and non-anchor carrier having a frequency point of $F_{anchor} + \Delta F_{15M}$ is performed, or transmission only on non-anchor carrier having a frequency point of $F_{anchor} + \Delta F_{15M}$ is performed, where $F_{anchor}$ is the frequency point of the anchor carrier and $\Delta F_{15M}$ is a fixed value related to the system bandwidth. |
| 110 | Bandwidth for the LTE system is 20 MHz; and transmission on anchor carrier and non-anchor carrier having a frequency point of $F_{anchor} - \Delta F_{20M}$ is performed, or transmission only on non-anchor carrier having a frequency point of $F_{anchor} - \Delta F_{20M}$ is performed, where $F_{anchor}$ is the frequency point of the anchor carrier and $\Delta F_{20M}$ is a fixed value related to the system bandwidth. |
| 111 | Bandwidth for the LTE system is 20 MHz; and transmission on anchor carrier and non-anchor carrier having a frequency point of $F_{anchor} + \Delta F_{20M}$ is performed, or transmission only on non-anchor carrier having a frequency point of $F_{anchor} + \Delta F_{20M}$ is performed, where $F_{anchor}$ is the frequency point of the anchor carrier and $\Delta F_{20M}$ is a fixed value related to the system bandwidth. |

In particular, different manners of indicating the frequency-domain position for transmission of the SIB1-NB may be used in different operation modes, respectively. For example, in the stand-alone operation mode and in the in-band operation mode, the indication manner shown in Tables 3-7 may be used, wherein the MIB-NB can indicate that a carrier left or right adjacent to the anchor carrier is used as the non-anchor carrier for transmission of the SIB1-NB; in the guard-band operation mode, the indication manner shown in Tables 3-7 may still be used, and an additional indication field for indicating the absolute frequency-domain offset of the non-anchor carrier for transmission of the SIB1-NB is introduced into the MIB-NB, as shown in Tables 8 and 9. The specific method for indicating the carrier for the SIB1-NB is as described above.

Referring to FIG. 4, the manner of implicitly indicating, by the MIB-NB, time-frequency resources for transmission of the SIB1-NB may be as follows: the system specifies that fixed several combinations of time-and-frequency domain resources are supported, and a combination of resources actually used for transmission of the SIB1-NB is indicated by an index value in the MIB-NB.

One method may be indication of the uplink and downlink subframe configuration indexes (for example, Table 1) in the MIB-NB. There is an association between the uplink and downlink configuration indexes and the time-frequency resources (or time-domain resources, or frequency-domain resources) used for transmission of the SIB1-NB. For example, when it is indicated that the uplink and downlink subframe configuration is uplink and downlink subframe configuration 1 #, 2 #, 4 # or 5 # in Table 1, the SIB1-NB is transmitted on subframe 4 # of an anchor carrier; when it is indicated that the uplink and downlink subframe configuration is another configuration in Table 1, the SIB1-NB is transmitted on subframe 0 # (or subframe 5 #) of a non-anchor carrier at a fixed position (for example, a carrier adjacent to the anchor carrier).

Another method is as shown in FIG. 4, wherein the UE determines, according to the position of the carrier for transmission of the SIB1-NB indicated by the MIB-NB, the time-domain position for receiving the SIB1-NB. The indicated position of the carrier for transmission of the SIB1-NB contains the anchor carrier and/or the non-anchor carrier, and the specific indication manner may be as shown in Tables 3-7. The manner of determining the time-domain position has the following three situations.

Situation 1: If the SIB1-NB is transmitted on the anchor carrier, the SIB1-NB is transmitted on a fixed subframe, wherein the fixed subframe may be one or more of downlink subframes such as subframe #0, subframe #4, subframe #6 and subframe #8. Specifically, when the fixed subframe is subframe #0, the SIB1-NB is transmitted only on subframe #0 (e.g., 413, 414) of each odd radio frame (e.g., 411, 412); and, when the number of times of repetition for the SIB1-NB is configured as 16, the start radio frames for the SIB1-NB in all cells are the same, as shown in example 1 of FIG. 4. The method for transmitting the SIB1-NB on multiple subframes of a same carrier is as described above.

Situation 2: If the SIB1-NB is transmitted only on a non-anchor carrier, the SIB1-NB is transmitted on a fixed subframe, wherein the fixed subframe may be one or more of downlink subframes such as subframe #0, subframe #5 or subframe #9. The used subframe may be the same as or different from the subframe used in Situation #1, or even the number of used subframes may be different from that in Situation 1. Example 2 of FIG. 4 schematically shows time-domain resources occupied by transmission of the SIB1-NB on the non-anchor carrier, by taking only subframe #0 (e.g., 421, 422, 423, 424) for example. The method for transmitting the SIB1-NB on multiple subframes of a same carrier is as described above.

Situation 3: If the SIB1-NB is transmitted on the anchor carrier and the non-anchor carrier, i.e., multi-carrier frequency-hopping transmission, the SIB1-NB is transmitted on fixed subframes of the anchor carrier and the non-anchor carrier, respectively. For the frequency-hopping transmission of the SIB1-NB, the used subframes on the anchor carrier may be the same as or different from those on the non-anchor carrier, or the number of the used subframes on the anchor carrier may be different from that on the non-anchor carrier. Example 3 of FIG. 4 schematically shows time-domain resources occupied by the frequency-hopping transmission of the SIB1-NB, by taking for example that subframe #0 (e.g., 431, 432) on the anchor carrier and subframe #0 (e.g., 433, 434) on the non-anchor carrier are used for transmission of the SIB1-NB. The method for transmitting the SIB1-NB on multiple subframes of a same carrier is as described above.

The time-domain position for transmission of the SIB1-NB may also be explicitly indicated by the MIB-NB. The detailed implementation is as described above.

Step 203: According to the indication in the MIB-NB and/or the SIB1-NB, the UE acquires time-domain and frequency-domain resources used by the base station to transmit other SIBs-NB, and receives the other SIBs-NB on the time-domain and frequency-domain resources. The other SIBs-NB comprise, but are not limited to, one or more of SIB2-NB, SIB3-NB, SIB4-NB, SIB5-NB, SIB14-NB and SIB16-NB. The frequency-domain resources comprise one or more carriers which can be anchor carriers or non-anchor carriers. Reading the indication in the SIB1-NB may comprise reading resource allocation information for other SIBs-NB in the SIB1-NB. Reading the indication in the MIB-NB may comprise reading an uplink and downlink subframe configuration index in the MIB-NB and determining time-domain and frequency-domain resources for the SIB-NB according to the uplink and downlink subframe configuration index. For example, when the uplink and downlink subframe configuration index in the MIB-NB is 0 # (or 1 #, or 6 #) in Table 1, the other SIBs-NB and the SIB1-NB are transmitted on different carriers, and the carrier for transmission of the other SIBs-NB can be calculated according to the position of the anchor carrier or indicated in the SIB1-NB; when the uplink and downlink subframe configuration index in the MIB-NB is 2 # (or 3 #, or 4 #, or 5 #) in Table 1, the other SIBs-NB and the SIB1-NB are transmitted in the same carrier. Such a design can ensure that, in an uplink and downlink subframe configuration with a low proportion of downlink subframes, the system has enough downlink resources, i.e., downlink subframes on the non-anchor carrier.

In addition to the existing indication of downlink invalid subframe configuration, uplink invalid subframes may be indicated in the SIB1-NB. When in a TDD scene, the uplink/downlink invalid subframe configurations can be used to indicate uplink subframes and downlink subframes, respectively. The configuration method of the time-domain resources can be the same as that in the existing mechanisms or the same as the configuration method of time-domain resources for the SIB1-NB in step 202. The configuration method of the frequency-domain resources (i.e., carriers) can be the same as the configuration method of the frequency-domain resources for the SIB1-NB in step 202, i.e., explicit indication, or implicit indication in conjunction with a certain rule. For example, in the explicit indication manner an offset between a carrier used for transmission of other SIBs-NB and an anchor carrier can be indicated in the SIB1-NB; or, multiple carriers can be configured implicitly in the SIB1-NB for the inter-carrier frequency-hopping transmission of other SIBs-NB (see Embodiment 3); or, it is agreed that a carrier used for the transmission of the SIB1-NB is reused as the carrier for the transmission of other SIBs-NB, which is implicit notification manner without indication bit.

Carriers used by the Narrowband Physical Downlink Control Channels (NPDCCHs), the Narrowband Physical Downlink Shared Channels (NPDSCHs) and the Narrowband Physical Uplink Shared Channels (NPUSCHs) transmitted subsequently by the UE can be configured in a same manner as that for the SIBs-NB. Information carrying the configuration information varies according to different information carrying physical channels. For example, system information, such as SIB2-NB, can be used to configure carriers used by the commonly transmitted NPDCCHs and NPDSCHs; and user-specific signaling, such as a contention resolution message Msg4, can be used to configure carriers used by the user-specifically transmitted NPDCCHs, NPUSCHs and NPDSCHs. The configuration information of specific carriers can be indicated by the manner in which the configuration of the carriers used for transmission of the SIBs-NB is indicated, as described above. The NPUSCH can comprise NPUSCH format 1 and NPUSCH format 2.

Embodiment 2

Referring to FIG. 5, in this embodiment, a solution for implementing a NB IoT system in which the duplex mode is not transparent to the UE (or the terminal) is provided.

Step 501: A UE performs blind detection on NPSSs and NSSSs transmitted by a base station at all possible positions, so as to acquire the system duplex mode and complete cell search and downlink synchronization process; and according to the duplex mode the UE receives MIB-NB on time-domain resources and carriers corresponding to PBCHs transmitted by the base station. Herein, the frequency-domain resource position where any one of NPSSs, NSSSs and NPBCHs is can be at anchor carriers or non-anchor carriers.

In different duplex modes, the NPSSs and/or NSSSs use different physical resources. The physical resources used by the NPSSs and/or NSSSs are in one-to-one correspondence with the duplex modes. Therefore, the NPSSs and/or NSSSs can be used for indicating the system duplex mode to the UE. After the downlink synchronization is completed, the UE determines the duplex mode according to the physical resources used by the NPSSs and/or NSSSs, then determines, according to the duplex mode, corresponding time-domain and/or frequency-domain resources used by the NPBCHs, and receives the NPBCHs to acquire the MIB-NB. In different duplex modes, the time-frequency resources used by the NPBCHs can be the same or different. One instance where the time-frequency resources used by the NPBCHs are different with different duplex modes may be as follows: for two duplex modes, the NPBCHs are transmitted in the same carrier with different time-domain periods: in FDD, the NPBCHs are transmitted in subframe #0 of each radio frame on an anchor carrier, while in TDD, it can be assumed that the NPBCHs are transmitted in subframe #0 of a radio frame spacing a period apart on the anchor carrier. For example, it can be assumed that one NPBCH subframe is transmitted every $P_{MIB}$ radio frames, wherein the index of the radio frame on which the NPBCH is transmitted meets the formula $\mod(n_f, P_{MIB})=0$, where $n_f$ denotes the index of the radio frame, $P_{MIB}$ denotes the period in which the NPBCH is transmitted (a parameter configured by the system or a fixed parameter), and mod(*) denotes modulo operation; or, it can be assumed that a number of successive NPBCH subframes are transmitted every $P_{MIB}$ radio frames, wherein the index of the radio frame on which the NPBCHs are transmitted meets the formula $\mod(n_f, P_{MIB})=x$, $x \in \{0, \ldots, N_{MIB}\}$, where $n_f$ denotes the index of the radio frame, $P_{MIB}$ denotes the period in which the NPBCHs are transmitted (a parameter configured by the system or a fixed parameter), mod(*) denotes modulo operation, and $N_{MIB}$ denotes the number of the radio frames of the NPBCHs transmitted successively (a parameter configured by the system or a fixed parameter). Such a design can ensure that, when the downlink resources are limited in TDD, there is still a part of downlink resources available for unicast transmission. Further, if the NPSS and/or NSSS can indicate both the duplex mode and the uplink and downlink subframe configuration index, the UE can acquire different NPBCH transmission periods $P_{MIB}$ and/or the number of radio frames for successive transmission $N_{MIB}$ according to the uplink and downlink subframe configuration. For an uplink and downlink subframe configuration with limited downlink resources, $P_{MIB}$ and $N_{MIB}$ may be greater; for an uplink and downlink subframe configuration with sufficient downlink resources, $P_{MIB}$ and $N_{MIB}$ may be less. The physical resources used by the NPSSs and/or NSSSs comprise at least one of time-domain resources, frequency-domain resources and sequence resources. For the method of indicating the duplex mode by the time-frequency resources used by the NPSSs and/or NSSSs, Embodiment 4 can be referred to. Additionally, the duplex mode can be determined by using the sequence resources as physical resources. For example, in the two duplex modes (TDD and FDD), the NPSSs and/or NSSSs use different orthogonal sequences to be transmitted on the same time-frequency resources, and the duplex modes are in one-to-one correspondence with the orthogonal sequences used by the NPSSs and/or NSSSs. The correspondence with the orthogonal sequences can be as follows: in the two duplex modes, the NPSSs use different ZC root sequences. For example, in the FDD mode, a ZC root sequence with an index of 5 is used, while in the TDD mode, other ZC root sequences with low correlation are used. Or, the correspondence with the orthogonal sequences can be as follows: in the two duplex modes, the NPSSs use different orthogonal mask sequences. Taking normal subframe scene as an example, an example of generation of mask sequences for NPSSs in the two duplex modes will be described below. The mask sequence in FDD is shown in Table 11, belonging to the existing implementation.

TABLE 11

Example of mask sequence used by NPSSs in FDD

| Duplex mode | S(3), ... , S(13) | | | | | | | | | |
|---|---|---|---|---|---|---|---|---|---|---|
| FDD | 1 | 1 | 1 | 1 | −1 | −1 | 1 | 1 | 1 | −1 | 1 |
| TDD | 1 | $e^{-j\frac{\pi}{11}}$ | $e^{-j\frac{2\pi}{11}}$ | $e^{-j\frac{3\pi}{11}}$ | $-e^{-j\frac{4\pi}{11}}$ | $-e^{-j\frac{5\pi}{11}}$ | $e^{-j\frac{6\pi}{11}}$ | $e^{-j\frac{7\pi}{11}}$ | $e^{-j\frac{8\pi}{11}}$ | $-e^{-j\frac{9\pi}{11}}$ | $e^{-j\frac{10\pi}{11}}$ |

The mask sequence used by the NPSSs in TDD can be generated according to the following formula:

$$S(n) = \rho(n) \cdot e^{-j\frac{\pi}{11}(n-3)k}, n = 3, \ldots, 13,$$

where if n=7, 8, 12, ρ(n)=−1; otherwise, ρ(n)=1; and where k is any positive integer from 1 to 10. Table 2 shows a special example of mask sequence used by the NPSSs in TDD at k=1.

Step 502: According to the MIB-NB indication carried in the NPBCH transmitted by the base station (reading the resource allocation information in the MIB-NB), or according to the MIB-NB indication in combination with the duplex mode, the UE acquires time-domain and/or frequency-domain resources used by the base station to transmit the SIB1-NB, and receives the SIB1-NB on the time-domain and/or frequency-domain resources. The frequency-domain resources comprise one or more carriers which can be anchor carriers or non-anchor carriers.

The manner in which the MIB-NB indicates the time-frequency resources used by the SIB1-NB can be explicit indication, or implicit indication in conjunction with a certain rule. The configuration method is the same as that in Embodiment 1.

The rule for acquiring, according to the MIB-NB indication and in combination with the duplex mode, time-domain and/or frequency-domain resources used by the base station to transmit the SIB1-NB can be as follows: in FDD the UE receives the SIB1-NB on subframe #4 of an anchor carrier while in TDD the UE receives the SIB1-NB on a fixed subframe of a non-anchor carrier having a fixed offset from the anchor carrier, and the UE acquires, in combination with the transmission cycle, the number of times of repetition and the like for the SIB1-NB contained in the MIB-NB information, information about the radio frame used to transmit the SIB1-NB. The non-anchor carrier having a fixed offset from the anchor carrier can be a carrier adjacent to the anchor carrier. The fixed subframe can be subframe #0 or subframe #5.

Step 503: According to the indication in the SIB1-NB (reading the resource allocation information in the SIB1-NB), the UE acquires time-domain and/or frequency-domain resources used by the base station to transmit other SIBs-NB, and receives other SIBs-NB on the time-domain and/or frequency-domain resources. The frequency-domain resources comprise one or more carriers which can be anchor carriers or non-anchor carriers.

With regard to the uplink and downlink subframe configurations, in addition to the method of using uplink invalid subframe indication and downlink invalid subframe indication in the SIB1-NB to configure uplink subframes and downlink subframes, respectively, in the TDD scene as in Embodiment 1, the base station can transmit, in the SIB1-NB, an index of an uplink and downlink subframe configuration in Table 1 for the in-band operation scene. In this case, the UE first reads the operationModeInfo-r13 information in the MIB-NB and, if the operation mode is the in-band operation mode (Inband-SamePCI-NB-r13 or Inband-DifferentPCI-NB-r13), acquires the uplink and downlink subframe configuration information according to the index of the uplink and downlink subframe configuration in the SIB1-NB.

The other SIBs-NB comprise, but are not limited to, one or more of SIB2-NB, SIB3-NB, SIB4-NB, SIB5-NB, SIB14-NB and SIB16-NB. The time-domain resources can be configured in the same manner as that in the step 203 in Embodiment 1. Carriers used by the NPDCCHs, the NPD-SCHs and the NPUSCHs transmitted subsequently by the UE can be configured in the same manner as that in the step 203 in Embodiment 1.

Several detailed solutions described in Embodiment 1 and Embodiment 2 can be combined.

Embodiment 3

In this embodiment, a multi-carrier configuration method for the inter-carrier frequency-hopping transmission of physical channels is provided. The physical channels comprise, but are not limited to, NPDSCHs, NPDCCHs, NPUSCH format 1, NPUSCH format 2, etc. The multi-carrier configuration method can be applied to a scene in which the duplex mode is transparent to the UE as described in Embodiment 1, and also to a scene in which the duplex mode is not transparent to the UE as described in Embodiment 2. That is, the multi-carrier configuration method can be applied to the frequency-hopping transmission of the SIB1-NB, other SIBs-NB, NPDSCHs, NPDCCHs, NPUSCH format 1, NPUSCH format 2 and the like in Embodiment 1 and Embodiment 2.

Since the NB IoT can be deployed in the band for the LTE system and eMTC can also be deployed in the LTE band, the configured multiple carriers (i.e., physical resource blocks) have to avoid the physical resource blocks used by the LTE system to transmit public signaling such as PBCHs, non-master information system information and downlink synchronization signals, and also have to avoid the physical resource blocks used by the eMTC to transmit the SIB1-BR. The UE needs to acquire configuration parameters for an offset of a start carrier, the index of the start carrier, carrier gap and the number of carriers, and determine, in accordance with a certain rule, the positions of multiple carriers used for the inter-carrier frequency-hopping transmission of the physical channels. The offset of the start carrier indicates frequency gap between the start carrier of the configured multiple carriers and an anchor carrier; the index of the start carrier indicates the sequence number of the start carrier of the configured multiple carriers; the carrier gap indicates frequency gap between any two adjacent carriers of the configured multiple carriers; and the number of carriers indicates the number of the configured multiple carriers.

Referring to FIG. 6, the rule for determining the positions of multiple carriers used for the inter-carrier frequency-hopping transmission of the physical channels comprises: the UE first determines the frequency-domain position of the start carrier of the configured multiple carriers according to the offset (601) of the start carrier, then determines the number of the configured multiple carriers according to the number of carriers, determines the sequence number of the start carrier in the configured multiple carriers according to the index (602) of the start carrier, and searches, upward or downward from the start carrier according to the index (602) of the start carrier, for the positions of the multiple carriers. For example, in the example shown in FIG. 6, the number of carriers is 4 and the index (602) of the start carrier is #1. In this case, beginning from the frequency-domain position of the start carrier, the UE determines a frequency-domain position having one carrier gap upward as carrier #0 (610), a frequency-domain position having one carrier gap downward as carrier #2 (612), and a frequency-domain position having two carrier gaps downward as carrier #3 (613). So far, the UE has obtained the positions of all the carriers.

Referring to FIG. 7A and FIG. 7B, when in a scene of the inter-carrier frequency-hopping transmission of the SIB1-NB, the UE can receive the SIB1-NB on fixed subframes of the configured multiple carriers (for example, subframe #0 or subframe #5), or can determine subframes used by the SIB1-NB according to the carrier configuration information, wherein configuration parameters for the multiple carriers determines, in accordance with a certain rule, the subframes used for transmission of the SIB1-NB. An example is given in FIG. 7A: when the offset of the start carrier read by the UE is 0 (in this case, the base station transmits the SIB1-NB by an anchor carrier), the UE receives the SIB1-NB on a certain fixed subframe which can be subframe #4 (e.g., 711, 712, 713, 714 in FIG. 7A). Another example is given in FIG. 7B: when the offset of the start carrier read by the UE is not 0 (in this case, the base station does not transmit the SIB1-NB by an anchor carrier), the UE receives the SIB1-NB on a certain fixed subframe which can be subframe #0 or subframe #5 (e.g., 721, 722, 723, 724 in FIG. 7B). The base station can configure the offset of the start carrier according to the system duplex mode. For example, when the system duplex mode is FDD, or when the system duplex mode is TDD and subframe #4 is a downlink subframe, the offset of the start carrier is configured as 0; otherwise, the offset of the start carrier is configured as 1.

The multi-carrier configuration method can be explicit or implicit. The explicit configuration means that one or more of the multi-carrier configuration parameters are configured in such a manner that the values of the parameters are directly indicated. The implicit configuration means that the values of one or more of the multi-carrier configuration parameters are fixed by the system, or determined according to the indication bit in conjunction with the system rule. A parameter configuration instance combining explicit configuration and implicit configuration will be described below, taking configuration, by the MIB-NB, of multiple carriers used for the inter-carrier frequency-hopping transmission of the SIB1-NB as an example. In the MIB-NB, two bits (indication bits) are used to indicate the offset of the start carrier $F_{offset}$, and a set of optional parameters is {360 kHz, −360 kHz, 0 kHz}; two bits are used to indicate the index of the start carrier $I_{start}$, and a set of optional parameters is {0,1,2,3}; and when the NB IoT is in the in-band operation mode, three bits are used to indicate both the number of carriers $N_{PRB}$ and the carrier gaps $F_{gap1}$ and $F_{gap2}$, as shown in Table 12.

TABLE 12

| Example of multi-carrier configuration parameters | | | | | |
|---|---|---|---|---|---|
| Index value | 0 | 1 | 2 | 3 | 4 |
| The number of carriers $N_{PRB}$ | 2 | 2 | 2 | 4 | 4 |
| Carrier gap $F_{gap1}$ | 1260 kHz | 2340 kHz | 4320 kHz | 3240 kHz | 4320 kHz |
| Carrier gap $F_{gap2}$ | 0 | 0 | 0 | 180 kHz | 0 |

The indication bits $I_{FH}$ (i.e., the index values in Table 12) for indicating $N_{PRB}$, $F_{gap1}$ and $F_{gap2}$ are selected according to the bandwidth for the LTE system, as shown in Table 13.

TABLE 13

List of bandwidths for the LTE system

| Index value | 0 | 1 | 2 | 3 | 4 |
|---|---|---|---|---|---|
| Bandwidth for the LTE system | 3 MHz | 5 MHz | 10 MHz | 15 MHz | 20 MHz |

When the NB IoT is in the guard-band operation mode or the stand-alone operation mode, the configuration parameters in Table 12 can be reused, or certain default configuration values can be used. If it is assumed that the central frequency point of the anchor carrier is $F_{anchor}$, the UE can obtain the indexes of the physical resource blocks used for transmission of the SIB1-NB according to the following formula:

$$F_{anchor}+F_{offset}+(i-I_{start})\times F_{gap1}+m\times F_{gap2},$$
$$i=0,\ldots,N_{PRB}-1,$$

where $$m = \begin{cases} -1, & i=0,1 \text{ and } I_{start}=2,3 \\ 1, & i=2,3 \text{ and } I_{start}=0,1 \\ 0, & \text{others} \end{cases}$$

When the NB IoT is in the in-band operation mode or the guard-band operation mode, the base station can select proper configuration values, according to the present usage condition of carriers in the system, to avoid the intermediate 72 subcarriers for the LTE and the physical resource blocks possibly used by the eMTC to transmit the SIB1-BR. For example, when the bandwidth of the system is 20 MHz and the anchor carrier is a physical resource block with an index of 4 in the LTE, the base station can configure: $F_{offset}$=360 kHz, $I_{start}$=0, and indication bits $I_{FH}$=4.

After the UE acquires the positions of the multiple carriers, frequency-hopping reception or transmission is performed from a start carrier according to the frequency-hopping transmission pattern, wherein the start carrier is defined as a carrier used for reception or transmission by the start subframe. The start carrier may be a carrier having the highest or lowest frequency point among the assigned multiple carriers; or, the start carrier may be the anchor carrier. The frequency-hopping may start from the start carrier and cyclically traverse all the frequency points in an order from the highest to the lowest frequency points or from the lowest to the highest frequency points.

FIG. 8 is a schematic diagram of patterns of frequency-hopping transmission of a downlink physical channel on multiple carriers, according to the present disclosure.

The time-frequency resources used for the frequency-hopping transmission may form a frequency-hopping transmission pattern. Taking for example frequency-hopping transmission on the two carriers, i.e., the anchor carrier and the non-anchor carrier, FIG. 8 shows a detailed implementation of the frequency-hopping pattern. Different frequency-hopping patterns may be applied to different cells or different users. The basic principle is as follows: starting from the start carrier (which may be the anchor carrier or the non-anchor carrier), transmission alternately on the two carriers is performed, wherein the minimum time granularity for frequency-hopping in example 1 (810) and example 2 (820) is one radio frame and the minimum time granularity for frequency-hopping in example 3 (830) and example 4 (840) is less than one radio frame; and, there are no interrupt radio frame among frequency-hopping transmission in example 1 (810) and example 3 (830), and there are interrupt radio frames among frequency-hopping transmission in example 2 (820) and example 4 (840).

Embodiment 4

In the embodiment 4, an instance of indicating the duplex mode by using the time-frequency resources for NPSSs and/or NSSSs will be provided.

During cell search, the UE receives NPSSs, transmitted by the base station, on fixed subframes of carriers fulfilling the channel raster, performs blind detection on the time-frequency resource positions where the base station may transmit NSSSs (wherein the frequency-domain resource positions for NPSSs and/or NSSSs may be on anchor carriers or on non-anchor carriers), and identifies the duplex mode currently used by the cell according to the detected time-frequency resource positions for NSSSs. In different duplex modes, the same sequences can be used for NPSSs and NSSSs. After the downlink synchronization is completed, the UE acquires, according to a certain rule, time-frequency resources used by the base station to transmit NPBCHs. The certain rule can be as follows: the UE receives NPBCHs on fixed time-frequency resources, for example, subframe #0 of an anchor carrier; or, the UE receives NPBCHs on different time-frequency resources according to the duplex mode, for example, if in FDD, the UE receives NPBCHs on subframe #0 of the anchor carrier, and if in TDD, the UE receives NPBCHs on subframe #5 of a non-anchor carrier having a fixed offset from the anchor carrier. The non-anchor carrier can be a carrier adjacent to the anchor carrier.

In TDD and FDD modes, at least one of the time-domain and frequency-domain resource positions for transmission of NPSSs and/or NSSSs is different. The different time-domain resource positions may mean that, in different duplex modes, NPSSs and/or NSSSs are transmitted on a subframe with the same index, but with different interval periods or transmission timing; or may mean that, in different duplex modes, NPSSs and/or NSSSs are transmitted on subframes with different indexes. The different frequency-domain resource positions may mean different carriers or different subcarriers on the same carrier.

Referring to FIG. 9, an example is given. During cell search, the UE (or the terminal) receives NPSSs on subframe #5 (912) of carriers fulfilling the channel raster, and then tries to receive NSSSs on subframe #9 (913) of even radio frames on an anchor carrier; if it receives NSSSs correctly, the UE can determine that the system duplex mode is FDD; and if it fails to detect NSSSs, the UE tries to receive NSSSs on subframe #0 (921) (or subframe #5 (922)) of odd radio frames on a non-anchor carrier having a fixed offset from the anchor carrier, if it receives NSSSs correctly, the UE can determine that the system duplex mode is TDD, otherwise the downlink synchronization by the UE fails. The non-anchor carrier having a fixed offset from the anchor carrier can be a carrier adjacent to the anchor carrier. After the downlink synchronization is completed, the UE receives NPBCHs on subframe #0 (911) of the anchor carrier. In this example, in TDD, NPSSs and NSSSs may also be transmitted on different subframes of the same anchor carrier. For example, when the UE receives NPSSs on subframe #9

(913) of the anchor carrier and NSSSs are detected on subframe #5 (912) of the anchor carrier, the UE can determine that the duplex mode of the system is TDD.

Referring to FIG. 10, another example is given. During cell search, the UE receives NPSSs on subframe #5 (e.g., 1012, 1022) of carriers fulfilling the channel raster, and then tries to receive NSSSs on subframe #9 of even radio frames on an anchor carrier; if it receives NSSSs correctly, the UE can determine that the system duplex mode is FDD; and if it fails to detect NSSSs, the UE tries to receive NSSSs on subframe #0 (1011) of odd radio frames on the anchor carrier, if it receives NSSSs correctly, the UE can determine that the system duplex mode is TDD, otherwise the downlink synchronization by the UE fails. The UE obtains time-frequency resources for NPBCHs according to the system duplex mode. If in FDD, the UE that has already completed the downlink synchronization receives NPBCHs on subframe #0 (1011) of the anchor carrier; and if in TDD, the UE that has already completed the downlink synchronization receives NPBCHs on subframe #0 (1021) of a non-anchor carrier having a fixed offset from the anchor carrier. The non-anchor carrier having a fixed offset from the anchor carrier can be a carrier adjacent to the anchor carrier.

FIG. 11 is a flowchart illustrating a process of acquiring the time-frequency resources for transmission of the SIB1-NB, according to the present disclosure.

To implement deployment of the NB IoT system in the TDD mode, a method for acquiring, by the UE, a central frequency point of a carrier for transmission of the SIB1-NB and time-frequency resources used for transmission of the SIB1-NB on the carrier will be described below. The method may be used in combination with the methods in Embodiment 1, 2, 3 or 4, and comprise the following steps:

Step 1101: The UE tunes a downlink central frequency point to the frequency point of an anchor carrier, receives NPSSs and NSSSs on the anchor carrier to perform downlink synchronization, and receives NPBCHs to read the MIB-NB.

Step 1102: The UE reads the MIB-NB to acquire the central frequency point of the carrier for transmission of the SIB1-NB, wherein the carrier for transmission of the SIB1-NB may be the anchor carrier or a non-anchor carrier. The MIB-NB indication acquired by the UE for determining the carrier for transmission of the SIB1-NB includes at least one of: indication of the central frequency point of the carrier for transmission of the SIB1-NB/indication of an index of a PRB for transmission of the SIB1-NB, the frequency offset between the carrier for transmission of the SIB1-NB and the central frequency point of the anchor carrier/the index offset between the PRB for transmission of the SIB1-NB and an anchor PRB, the operation mode of the carrier for transmission of the SIB1-NB, the operation mode of the anchor carrier, the bandwidth for the LTE system, and the number of subcarrier offsets between the central frequency point of the carrier for transmission of the SIB1-NB and an assigned frequency point/the frequency offset between the central frequency point of the carrier for transmission of the SIB1-NB and the assigned frequency point, wherein the assigned frequency point may be a carrier/PRB left or right adjacent to the anchor carrier.

Step 1103: The UE acquires the time-frequency resources for transmission of the SIB1-NB. The time-frequency resources include at least one of: an index of a used subframe on the carrier for transmission of the SIB1-NB, and the position of resource elements (REs) for rate matching when the SIB1-NB is transmitted on the used subframe on the carrier for transmission of the SIB1-NB. The indication acquired by the UE for determining the time-frequency resources for transmission of the SIB1-NB includes at least one of: the operation mode of the carrier for transmission of the SIB1-NB, the operation mode of the anchor carrier, indication of the index of the subframe for transmission of the SIB1-NB, the central frequency point of the carrier for transmission of the SIB1-NB, and an uplink and downlink subframe configuration.

Step 1104: The UE tunes the downlink central frequency point to the central frequency point of the carrier for transmission of the SIB1-NB, and receives the SIB1-NB according to the time-frequency resources for transmission of the SIB1-NB acquired in Step 1104.

In Step 1102, the UE acquires the operation mode of the anchor carrier and determines the manner of acquiring the central frequency point of the carrier for transmission of the SIB1-NB (or the index of the PRB for transmission of the SIB1-NB). In particular, the manner of acquiring the central frequency point of the carrier for transmission of the SIB1-NB by the UE varies with the operation mode of the anchor carrier. As an instance, if the UE obtains that the operation mode of the anchor carrier is the stand-alone operation mode, the carrier for transmission of the SIB1-NB is determined, according to the MIB-NB indication, as the anchor carrier or a carrier left or right adjacent to the anchor carrier, that is, the central frequency point of the carrier for transmission of the SIB1-NB has −200 kHz or +200 kHz from the frequency point of the anchor carrier. The MIB-NB indication may be configured as shown in Table 4. If the UE obtains that the operation mode of the anchor carrier is the in-band operation mode, the PRB for transmission of the SIB1-NB is determined, according to the MIB-NB indication, as the anchor PRB or a PRB left or right adjacent to the anchor PRB, that is, the central frequency point of the PRB for transmission of the SIB1-NB has −180 kHz or +180 kHz from the central frequency point of the anchor PRB, and also that is, the index value of the PRB for transmission of the SIB1-NB has −1 or +1 from the index value of the anchor PRB. The MIB-NB indication may be configured as shown in Table 4.

If the UE obtains that the operation mode of the anchor carrier is the guard-band operation mode, the carrier/PRB for transmission of the SIB1-NB is determined, according to the MIB-NB indication, as at least one of the following possibilities: the anchor carrier, or a carrier left adjacent to the anchor carrier, or a carrier right adjacent to the anchor carrier, or a non-anchor carrier having a certain frequency offset/subcarrier offset from the carrier left adjacent to the anchor carrier, or a non-anchor carrier having a certain frequency offset/subcarrier offset from the carrier right adjacent to the anchor carrier, or a non-anchor carrier having a certain frequency offset from the anchor carrier.

The UE may acquire the frequency offset between a non-anchor carrier for transmission of the SIB1-NB and the anchor carrier according to the operation mode of the anchor carrier, the bandwidth for the LTE system, and/or the frequency offset between the carrier for transmission of the SIB1-NB and the central frequency point of the anchor carrier (the index offset between the PRB for transmission of the SIB1-NB and the anchor PRB), and/or the relative position relation between the carrier for transmission of the SIB1-NB and the central frequency point of the anchor carrier. As an instance, if the UE obtains that the operation mode of the anchor carrier is the guard-band operation mode and that the relative position relation between the carrier for transmission of the SIB1-NB and the central frequency point of the anchor carrier is that the center frequency of the carrier for transmission of the SIB1-NB is lower than the center frequency of the anchor carrier, reads the indication of the bandwidth for the LTE system in the MIB-NB, and obtains, according to the association between the bandwidth for the LTE system and the absolute frequency offset between the carrier for transmission of the SIB1-NB and the central frequency point of the anchor carrier (such as configuration as shown in Table 8 and Table 9), that the absolute frequency offset between the carrier for transmission of the SIB1-NB and the central frequency point of the anchor carrier is F, the frequency offset between the carrier for transmission of the SIB1-NB and the central frequency point of the anchor carrier is −F. Otherwise, if the UE obtains that the relative position relation between the carrier for transmission of the SIB1-NB and the central frequency point of the anchor carrier is that the center frequency of the carrier for transmission of the SIB1-NB is higher than the center frequency of the anchor carrier, the UE obtains, through the same process, that the frequency offset between the carrier for transmission of the SIB1-NB and the central frequency point of the anchor carrier is +F. In this instance, the absolute frequency offset or the frequency offset between the carrier for transmission of the SIB1-NB and the central frequency point of the anchor carrier may also be indicated by the MIB-NB, that is, the MIB-NB may indicate the value of the absolute frequency offset F or indicate the value of the frequency offset +F/−F.

The UE may acquire the center frequency of the non-anchor carrier for transmission of the SIB1-NB according to the operation mode of the anchor carrier, the bandwidth for the LTE system, and/or the number of subcarrier offsets between the central frequency point of the carrier for transmission of the SIB1-NB and the assigned frequency point (or the frequency offset between the central frequency point of the carrier for transmission of the SIB1-NB and the assigned frequency point), and/or the relative position relation between the frequency point assigned for the SIB1-NB (or the carrier for transmission of the SIB1-NB) and the central frequency point of the anchor carrier, wherein the assigned frequency point is a left/right adjacent carrier having +180 kHz or −180 kHz from the central frequency point of the anchor carrier. As an instance, if the UE obtains that the operation mode of the anchor carrier is the guard-band operation mode and that the relative position relation between the frequency point assigned for the SIB1-NB and the central frequency point of the anchor carrier is that the center frequency of the frequency point assigned for the SIB1-NB is lower than the center frequency of the anchor carrier, the frequency point assigned for the SIB1-NB is a carrier left adjacent to the anchor carrier; otherwise, the frequency point assigned for the SIB1-NB is a carrier right adjacent to the anchor carrier. The UE reads the indication of the bandwidth for the LTE system in the MIB-NB, and acquires the absolute frequency offset (or the absolute frequency offset) between the carrier for transmission of the SIB1-NB and the central frequency point of the anchor carrier according to the association between the bandwidth for the LTE system and the absolute number of subcarrier offsets (or the absolute frequency offset) between the central frequency point of the carrier for transmission of the SIB1-NB and the assigned frequency point; or the UE directly reads information in the MIB-NB indicating the absolute number of subcarrier offsets (or the absolute frequency offset) between the central frequency point of the carrier for transmission of the SIB1-NB and the assigned frequency point. It is assumed that the UE obtains that the number of subcarrier offsets is $N \cdot F_{SC}$, where N is the absolute number of subcarrier offsets and may be a positive number or zero, and $F_{SC}$ is a subcarrier gap. Taking the subcarrier gap $F_{SC}$ of 15 kHz for example, if the frequency point assigned for the SIB1-NB is a carrier left adjacent to the anchor carrier, the UE obtains that the frequency offset between the carrier for transmission of the SIB1-NB and the central frequency point of the anchor carrier is −(N+12)·15 kHz, that is, offset to the left by (N+12) subcarriers from the central frequency point of the anchor carrier; if the frequency point assigned for the SIB1-NB is a carrier right adjacent to the anchor carrier, the UE obtains that the frequency offset between the carrier for transmission of the SIB1-NB and the central frequency point of the anchor carrier is (N+12)·15 kHz, that is, offset to the right by (N+12) subcarriers from the central frequency point of the anchor carrier. In the above instance, the number of subcarrier offsets (or the frequency offset) between the carrier for transmission of the SIB1-NB and the assigned frequency point may also be indicated by the MIB-NB, that is, the value of the indicated N may be a positive number or a negative number or zero. The UE may directly read the MIB-NB to acquire the information indicating the absolute number of subcarrier offsets (or the absolute frequency offset) between the central frequency point of the carrier for transmission of the SIB1-NB and the assigned frequency point in the manner as shown in Table 14.

TABLE 14

| Indication field for absolute number of subcarrier offsets (or absolute frequency offset) between central frequency point of carrier for transmission of the SIB1-NB and the assigned frequency point in the MIB-NB | Absolute number N of subcarrier offsets (or absolute frequency offset) between central frequency point of carrier for transmission of the SIB1-NB and the assigned frequency point |
|---|---|
| 0 | 3 (45 kHz) |
| 1 | 0 (0 kHz) |

The UE may directly read the MIB-NB to acquire the information indicating the number of subcarrier offsets (or the frequency offset) between the central frequency point of the carrier for transmission of the SIB1-NB and the assigned frequency point in the manner as shown in Table 15.

TABLE 15

| Indication field for the number of subcarrier offsets (or frequency offset) between central frequency point of carrier for transmission of the SIB1-NB and the assigned frequency point in the MIB-NB | The number N of subcarrier offsets (or frequency offset) between central frequency point of carrier for transmission of the SIB1-NB and the assigned frequency point |
|---|---|
| 00 | 0 (0 kHz) |
| 01 | 3 (45 kHz) |
| 10 | −3 (−45 kHz) |

The UE may acquire the absolute frequency offset (or the absolute frequency offset) between the carrier for transmission of the SIB1-NB and the central frequency point of the anchor carrier according to the association between the bandwidth for the LTE system and the absolute number of subcarrier offsets (or the absolute frequency offset) between the central frequency point of the carrier for transmission of the SIB1-NB and the assigned frequency point in the manner as shown in Table 16.

TABLE 16

| Indication field in the MIB-NB | Bandwidth for the LTE system | Absolute frequency offset N (or absolute frequency offset) between carrier for transmission of the SIB1-NB and central frequency point of anchor carrier |
|---|---|---|
| 00 | 5 MHz | 3 (45 kHz) |
| 01 | 10 MHz | 0 (0 kHz) |
| 10 | 15 MHz | 3 (45 kHz) |
| 11 | 20 MHz | 0 (0 kHz) |

In Step 1103, the UE may acquire the index of the used subframe on the carrier for transmission of the SIB1-NB according to the indication of the index of the subframe for transmission of the SIB1-NB, and/or the central frequency point of the carrier for transmission of the SIB1-NB, and/or the uplink and downlink subframe configuration. For the specific method, Embodiment 1 may be referred to.

In Step 1103, the UE may acquire the position of the REs for rate matching when the SIB1-NB is transmitted on the used subframe on the carrier for transmission of the SIB1-NB according to the operation mode of the carrier for transmission of the SIB1-NB and/or the operation mode of the anchor carrier. As one implementation, the UE may read the MIB-NB indication, and/or read the operation mode of the anchor carrier and acquire the operation mode of the carrier for transmission of the SIB1-NB according to the relation between the operation mode of the anchor carrier and the operation mode of the carrier for transmission of the SIB1-NB. As an instance, if the UE obtains that the operation mode of the carrier for transmission of the SIB1-NB is the stand-alone operation mode or the guard-band operation mode, the UE obtains that the position of the REs for rate matching when the SIB1-NB is transmitted on the used subframe on the carrier for transmission of the SIB1-NB is all REs within the subframe for transmission of the SIB1-NB except NRS, that is, resource mapping is performed from a symbol with the subframe index of 0. When the UE obtains that the operation mode of the carrier for transmission of the SIB1-NB is the in-band operation mode, if the operation mode of the anchor carrier is also the in-band operation mode, the UE acquires the number of LTE CRS ports and/or LTE Physical Layer Cell Identity (PCI) according to the configuration for the operation mode of the anchor carrier in the MIB-NB, and calculates the position of the RE occupied by the LTE CRS. In this case, the UE obtains that the position of the REs for rate matching when the SIB1-NB is transmitted on the used subframe on the carrier for transmission of the SIB1-NB starts from a symbol with the subframe index of 3, and available REs don't contain the position of the LTE CRS and the position of the NRS. When the UE obtains that the operation mode of the carrier for transmission of the SIB1-NB is the in-band operation mode, if the operation mode of the anchor carrier is the guard-band operation mode or the stand-alone operation mode, the UE assumes that the number of the LTE ports is 4 and $N_{ID}^{cell}=N_{ID}^{Ncell}$, and calculates the position of the RE occupied by the LTE CRS, where $N_{ID}^{cell}$ is LTE Physical Layer Cell Identity (PCI), and $N_{ID}^{cell}$ is NB-IoT Narrowband Physical Layer Cell Identity (NPCI). In this case, the UE obtains that the position of the REs for rate matching when the SIB1-NB is transmitted on the used subframe on the carrier for transmission of the SIB1-NB starts from a symbol with the subframe index of 3, and available REs don't contain the position of the LTE CRS and the position of the NRS.

As an instance of acquiring by the UE the operation mode of the carrier for transmission of the SIB1-NB, if the UE obtains that the operation mode of the anchor carrier is the in-band operation mode or the stand-alone operation mode, the UE assumes that the operation mode of the carrier for transmission of the SIB1-NB is the same as the operation mode of the anchor carrier; if the UE obtains that the operation mode of the anchor carrier is the guard-band operation mode, the UE reads the MIB-NB indication to obtain that the operation mode of the carrier for transmission of the SIB1-NB is the in-band operation mode or is not the in-band operation mode. As another instance of acquiring by the UE the operation mode of the carrier for transmission of the SIB1-NB, the UE acquires the operation mode of the anchor carrier and assumes that the operation mode of the carrier for transmission of the SIB1-NB is the same as the operation mode of the anchor carrier. As yet another instance of acquiring by the UE the operation mode of the carrier for transmission of the SIB1-NB, the UE reads the MIB-NB indication to obtain that the operation mode of the carrier for transmission of the SIB1-NB is the in-band operation mode or is not the in-band operation mode.

As shown in FIG. 12, a user equipment (UE) 1200 for access to NB IoT according to the present disclosure comprises a controller 1210 and transceiver module 1220.

The controller 1210 can be or includes at least one processor (such as, central processing unit (CPU) or graphic processing unit (GPU)). The controller 1210 may be configured to control the overall operations of the UE 1200. The controller 1210 includes a downlink synchronization module 1211, a master information acquisition module 1212, and a system information acquisition module 1213.

The downlink synchronization module 1211 for detecting a NPSS and a NSSS to realize downlink synchronization.

The master information acquisition module 1212 for detecting a NPBCH to acquire Narrowband Master Information Block (MIB-NB) information.

The system information acquisition module 1213 for acquiring Narrowband System Information Block Type 1 (SIB1-NB) according to the MIB-NB information.

wherein at least one of the NPSS, the NSSS, the MIB-NB and the SIB1-NB is contained in a non-anchor carrier.

The operation processes of the downlink synchronization module 1211, the master information acquisition module 1212 and the system information acquisition module 1213 correspond to steps 101, 102 and 103 of the method for access to NB IoT according to the present disclosure as described above, respectively, and will not be repeated here.

The transceiver module 1220 includes transmitter 1221 and receiver 1222.

The UE 1200 may further comprises memory unit, and the memory unit stores data such as a basic program, an application program, and setting information for the operation of the UE 1200.

Referring to FIG. 13, a method for configuring access to NB IoT according to the present disclosure comprises the following steps:

Step 1301: transmitting a NPSS and a NSSS to realize downlink synchronization;

Step 1302: transmitting Narrowband Master Information Block (MIB-NB) on a NPBCH to configure basic transmission parameters of a system; and Step 1303: transmitting Narrowband System Information Block Type 1 (SIB1-NB) to configure other basic transmission parameters of the system, wherein at least one of the NPSS, the NSSS, the MIB-NB and the SIB1-NB is transmitted on a non-anchor carrier.

The method for configuring access to NB IoT according to the present disclosure corresponds to the method for access to NB IoT. The method for access to NB IoT is applied to a UE, and the method for configuring access to NB IoT is applied to a base station equipment. The above Embodiments 1, 2, 3 and 4 can be referred to for embodiments of the method for configuring access to NB IoT according to the present disclosure, which will not be repeated here. It is to be noted that the MIB-NB transmitted by the base station contains basic transmission parameters of the system, such as the frequency band operation mode of the NB IoT system (stand-alone operation, in-band operation and guard-band operation) and the frame number, and the base station transmits the MIB-NB to inform the UE of these basic transmission parameters. The SIB1-NB transmitted by the base station contains other basic transmission parameters of the system, such as selection of a cell, power, downlink unavailable subframes for NB IoT, and a reference signal, and the base station transmits the SIB1-NB to inform the UE of these other basic transmission parameters. Both the MIB-NB and the SIB1-NB are contents that have to be acquired by the UE to access the network.

As shown in FIG. 14, a base station 1400 for configuring access to NB IoT according to the present disclosure comprises a controller 1410 and transceiver module 1420.

The controller 1410 can be or includes at least one processor (such as, central processing unit (CPU) or graphic processing unit (GPU)). The controller 1410 may be configured to control the overall operations of the base station 1400. The controller 1410 includes a downlink synchronization module 1411, a master information acquisition module 1412, and a system information acquisition module 1413.

The downlink synchronization module 1421 for transmitting a NPSS and a NSSS to realize downlink synchronization;

The master information configuration module 1422 for transmitting Narrowband Master Information Block (MIB-NB) on a NPBCH to configure basic transmission parameters of a system; and The system information configuration module 1423 for transmitting Narrowband System Information Block Type 1 (SIB1-NB) to configure other basic transmission parameters of the system, wherein at least one of the NPSS, the NSSS, the MIB-NB and the SIB1-NB is transmitted on a non-anchor carrier.

The operation processes of the downlink synchronization module 1421, the master information configuration module 1422 and the system information configuration module 1423 correspond to steps 1301, 1302 and 1303 of the method for configuring access to NB IoT according to the present disclosure, respectively, and will not be repeated here.

The transceiver module 1420 includes transmitter 1421 and receiver 1422.

The base station 1400 may further comprises memory unit, and the memory unit stores data such as a basic program, an application program, and setting information for the operation of the base station 1400.

It can be known from the detailed description of the embodiments of the present disclosure that, compared with the prior art, the present disclosure has at least the following beneficial technical effects.

First, the frequency-domain transmission resources for the NPSS, the NSSS, the MIB-NB and the SIB1-NB are extended from anchor carriers to non-anchor carriers, which can significantly reduce the load of the anchor carriers and enable the existing NB IoT to operate in Time Division Duplex (TDD) mode, thereby attaining higher usage of spectrum resources, and significantly improving the system throughput and the connection efficiency of the NB IoT system in the case of having a huge number of users connected.

Secondly, the UE determines the system duplex mode according to the resource positions for synchronization signals, determines frequency-domain resource position for the MIB-NB based on the system duplex mode, and then acquires the MIB-NB and the SIBs-NB, so that the system design can configure the frequency-domain transmission resources for the MIB-NB and the SIBs-NB according to different duplex modes, the duplex mode switching function is provided, and the flexibility and the extendibility of the LTE-based NB IoT system are improved.

Thirdly, solutions for configuring multiple carriers are provided for the frequency-hopping transmission of the SIBs-NB and the physical channels, so that the reliability and the overall performance of the system are significantly improved.

Fourthly, the position information of resources used for transmission of the SIBs-NB is indicated by explicit configuration or implicit configuration, so that the high demand for confidentiality and access security of the system is met.

In the provided embodiments of the present disclosure, it should be understood that the disclosed system, device and method may be implemented in other ways. For example, the device embodiments described above are merely exemplary. For example, the division of the units is merely division of logical functions. There may be other division ways in practical implementation. For example, multiple units or components may be combined together or may be integrated into another system, or some features may be omitted or not executed. In addition, the coupling or direct coupling or communication connection as shown or discussed may be the indirect coupling or communication connection through some interfaces, devices or units, and may be in electric, mechanical or other forms.

The units described as separated components may or may not be separated physically. Components, shown as units, may or may not be physical units, that is, they may be located in one place or distributed over a plurality of network units. Some or all of the units may be selected to attain the objective of the present disclosure according to practical requirement.

In addition, the functional units in the embodiments of the present disclosure may be integrated in one processing unit; or the functional units may be physically present as individual units; or two or more of the functional units may be integrated in one unit. The integrated units may be implemented in a form of hardware, or in a form of software functional units.

It may be understood by a person of ordinary skill in the art that all or part of the steps of the methods according to the embodiments may be implemented by instructing related hardware by programs. The programs may be stored in a computer-readable storage medium. The computer-readable storage medium may include Read Only Memories (ROMs), Random Access Memories (RAMs), magnetic disks, optical disks, etc.

The method and device of the present disclosure have been described in detail. For a person of ordinary skill in the art, changes may be made to the embodiments and the application range based on the concept of the present disclosure. In conclusion, the content of the description shall not be regarded as any limitation to the present disclosure.

The invention claimed is:

1. A method for access to Narrowband Internet of Things (NB IoT), comprising:
   receiving, on an anchor carrier, a narrowband primary synchronization signal (NPSS) and a narrowband secondary synchronization signal (NSSS) for synchronization;
   receiving, on the anchor carrier, a master information block (MIB) associated with a narrow band; and
   receiving, on a non-anchor carrier, a system information block (SIB) associated with the narrow band based on scheduling information in the MIB,
   wherein the SIB includes information indicating whether a carrier used for transmitting other SIBs is the non-anchor carrier or not,
   wherein the MIB is carried on a narrowband physical broadcast channel (NPBCH), and the SIB is carried on a narrowband physical downlink shared channel (NPDSCH), and
   wherein a number of repetitive transmissions and at least one subframe index for the NPDSCH carrying the SIB are determined based on the scheduling information in the MIB.

2. The method of claim 1, wherein the MIB includes information indicating whether a carrier used for transmitting the SIB is the non-anchor carrier or not.

3. The method of claim 1, further comprising:
   identifying whether the anchor carrier is in a standalone mode or in an inband mode based on the MIB; and
   identifying whether the non-anchor carrier is a lower adjacent carrier relative to the anchor carrier or a higher adjacent carrier relative to the anchor carrier, based on the anchor carrier being in the standalone mode or the inband mode.

4. The method of claim 1, further comprising:
   identifying whether the anchor carrier is in a guardband mode based on the MIB; and
   identifying whether the non-anchor carrier is in an inband mode based on the anchor carrier being in the guardband mode.

5. The method of claim 1, further comprising:
   identifying a LTE system bandwidth based on the MIB; and
   determining an offset between the anchor carrier and the non-anchor carrier as a predetermined frequency value, based on the LTE system bandwidth.

6. The method of claim 1, further comprising:
   identifying whether the anchor carrier is in a guardband based on the MIB; and
   identifying whether the non-anchor carrier is in another guardband opposite to the guardband based on the MIB.

7. A user equipment (UE) for access to Narrowband Internet of Things (NB IoT), comprising:
   a transceiver; and
   a processor coupled with the transceiver and configured to control to:
      receive, on an anchor carrier via the transceiver, a narrowband primary synchronization signal (NPSS) and a narrowband secondary synchronization signal (NSSS) for synchronization;
      receive, on the anchor carrier via the transceiver, a master information block (MIB) associated with a narrow band; and
      receive, on a non-anchor carrier via the transceiver, a system information block (SIB) associated with the narrow band based on scheduling information in the MIB,
   wherein the SIB includes information indicating whether a carrier used for transmitting other SIBs is the non-anchor carrier or not,
   wherein the MIB is carried on a narrowband physical broadcast channel (NPBCH), and the SIB is carried on a narrowband physical downlink shared channel (NPDSCH), and
   wherein a number of repetitive transmissions and at least one subframe index for the NPDSCH carrying the SIB are determined based on the scheduling information in the MIB.

8. The UE of claim 7, wherein the MIB includes information indicating whether a carrier used for transmitting the SIB is the non-anchor carrier or not.

9. The UE of claim 7, wherein the processor is further configured to:
   identify whether the anchor carrier is in a standalone mode or in an inband mode based on the MIB; and
   identify whether the non-anchor carrier is a lower adjacent carrier relative to the anchor carrier or a higher adjacent carrier relative to the anchor carrier, based on the anchor carrier being in the standalone mode or in the inband mode.

10. The UE of claim 7, wherein the processor is further configured to:
    identify whether the anchor carrier is in a guardband mode based on the MIB; and
    identify whether the non-anchor carrier is in an inband mode based on the anchor carrier being in the guardband mode.

11. A method for configuring access to Narrowband Internet of Things (NB IoT), comprising:
    transmitting, to a user equipment (UE) on an anchor carrier, a narrowband primary synchronization signal (NPSS) and a narrowband secondary synchronization signal (NSSS) for synchronization;
    transmitting, to the UE on the anchor carrier, a master information block (MIB) associated with a narrow band; and
    transmitting, to the UE on a non-anchor carrier, a system information block (SIB) associated with the narrow band,
    wherein the SIB includes information indicating whether a carrier used for transmitting other SIBs is the non-anchor carrier or not,
    wherein the MIB includes scheduling information for the SIB,
    wherein the MIB is carried on a narrowband physical broadcast channel (NPBCH), and the SIB is carried on a narrowband physical downlink shared channel (NPDSCH), and
    wherein a number of repetitive transmissions and at least one subframe index for the NPDSCH carrying the SIB are determined based on the scheduling information in the MIB.

12. The method of claim 11, wherein the MIB includes information indicating whether a carrier used for transmitting the SIB is the non-anchor carrier or not.

13. The method of claim 11, wherein the MIB includes information for indicating whether the anchor carrier is in a standalone mode or in an inband mode based on the MIB, and wherein the MIB includes information for indicating whether the non-anchor carrier is a lower adjacent carrier relative to the anchor carrier or a higher adjacent carrier relative to the anchor carrier when the anchor carrier is in the standalone mode or the inband mode.

14. The method of claim 11, wherein the MIB includes information for indicating whether the anchor carrier is in a guardband mode based on the MIB, and
wherein the MIB includes information for indicating whether the non-anchor carrier is in an inband mode when the anchor carrier is in the guardband mode.

15. The method of claim 11, wherein the MIB includes information for indicating a LTE system bandwidth, and
wherein an offset between the anchor carrier and the non-anchor carrier is determined as a predetermined frequency value based on the LTE system bandwidth.

16. The method of claim 11, wherein the MIB includes information for indicating whether the anchor carrier is in a guardband, and
wherein the MIB includes information for indicating whether the non-anchor carrier is in another guardband opposite to the guardband.

17. A base station for configuring access to a Narrowband Internet of Things (NB IoT), comprising:
a transceiver; and
a processor coupled with the transceiver and configured to control to:
transmit, to a user equipment (UE) on an anchor carrier, a narrowband primary synchronization signal (NPSS) and a narrowband secondary synchronization signal (NSSS) for synchronization;
transmit, to the UE on the anchor carrier, a master information block (MIB) associated with a narrow band; and
transmit, to the UE on a non-anchor carrier, a system information block (SIB) associated with the narrow band,
wherein the SIB includes information indicating whether a carrier used for transmitting other SIBs is the non-anchor carrier or not,
wherein the MIB includes scheduling information for the SIB,
wherein the MIB is carried on a narrowband physical broadcast channel (NPBCH), and the SIB is carried on a narrowband physical downlink shared channel (NPDSCH), and
wherein a number of repetitive transmissions and at least one subframe index for the NPDSCH carrying the SIB are determined based on the scheduling information in the MIB.

18. The base station of claim 17, wherein the MIB includes information indicating whether a carrier used for transmitting the SIB is the non-anchor carrier or not.

19. The base station of claim 17, wherein the MIB includes information for indicating whether the anchor carrier is in a standalone mode or in an inband mode based on the MIB, and
wherein the MIB includes information for indicating whether the non-anchor carrier is a lower adjacent carrier relative to the anchor carrier or a higher adjacent carrier relative to the anchor carrier when the anchor carrier is in the standalone mode or the inband mode.

20. The base station of claim 17, wherein the MIB includes information for indicating whether the anchor carrier is in a guardband mode based on the MIB, and
wherein the MIB includes information for indicating whether the non-anchor carrier is in an inband mode when the anchor carrier is in the guardband mode.

21. The base station of claim 17, wherein the MIB includes information for indicating a LTE system bandwidth, and
wherein an offset between the anchor carrier and the non-anchor carrier is determined as a predetermined frequency value based on the LTE system bandwidth.

22. The base station of claim 17, wherein the MIB includes information for indicating whether the anchor carrier is in a guardband, and
wherein the MIB includes information for indicating whether the non-anchor carrier is in another guardband opposite to the guardband.

* * * * *